(12) United States Patent
Palese et al.

(10) Patent No.: US 12,308,891 B2
(45) Date of Patent: May 20, 2025

(54) ARCHITECTURE FOR INCREASED POWER CONVERSION IN A POWER CONVERSION OVER LASER SYSTEM

(71) Applicant: TAARA CONNECT, INC., Sunnyvale, CA (US)

(72) Inventors: Stephen Palese, Redondo Beach, CA (US); Luis Angelo Larco Gomez, San Francisco, CA (US); Mauro Goncalves de Oliveira Filho, Los Gatos, CA (US)

(73) Assignee: TAARA CONNECT, INC., Sunnyvale, CA (US)

( * ) Notice: Subject to any disclaimer, the term of this patent is extended or adjusted under 35 U.S.C. 154(b) by 0 days.

(21) Appl. No.: 18/746,218

(22) Filed: Jun. 18, 2024

(65) Prior Publication Data

US 2025/0030488 A1 Jan. 23, 2025

Related U.S. Application Data

(60) Provisional application No. 63/527,465, filed on Jul. 18, 2023.

(51) Int. Cl.
*H04B 10/80* (2013.01)
(52) U.S. Cl.
CPC ................... *H04B 10/807* (2013.01)
(58) Field of Classification Search
None
See application file for complete search history.

(56) References Cited

U.S. PATENT DOCUMENTS

| | | |
|---|---|---|
| 11,569,912 B2 | 1/2023 | Fatemi et al. |
| 2018/0267250 A1* | 9/2018 | Hosseini ............... G01S 7/4816 |
| 2022/0050201 A1 | 2/2022 | Sun et al. |
| 2023/0100620 A1* | 3/2023 | Brinkley ................... G02F 1/00 |
| | | 398/183 |

FOREIGN PATENT DOCUMENTS

| | | |
|---|---|---|
| WO | 2017205549 A2 | 11/2017 |
| WO | 2023275285 A1 | 1/2023 |
| WO | WO-2023048785 A1 * | 3/2023 ............. G01S 17/66 |

OTHER PUBLICATIONS

International Search Report and Written Opinion for International Application No. PCT/US2024/037551 dated Oct. 11, 2024 (13 pages).

* cited by examiner

*Primary Examiner* — David W Lambert
(74) *Attorney, Agent, or Firm* — Botos Churchill IP Law LLP

(57) ABSTRACT

Aspects of the disclosure provide a method of converting power received in one or more optical power beams to electrical power. The method comprising receiving, at an OPA of a first optical terminal, a first optical power beam from a remote optical terminal; determining, by one or more processors, a first distribution of the received first optical power beam across a plurality of cells, wherein the plurality of cells are configured to convert power from the from optical power beams to electrical power, and the first distribution is determined based on an initial conversion capability of each of the plurality of cells; distributing, by an optical switch matrix, power from the first optical power beam across the plurality of cells based on the determined first distribution; and converting, by the plurality of cells, at least a portion of the first optical power beam to electrical power.

20 Claims, 11 Drawing Sheets

ARCHITECTURE FOR INCREASED POWER CONVERSION IN A POWER CONVERSION OVER LASER SYSTEM

CROSS-REFERENCE TO RELATED APPLICATIONS

The present application claims the benefit of the filing date of U.S. Provisional Application No. 63/527,465, filed Jul. 18, 2023, the entire disclosure of which is incorporated by reference herein.

BACKGROUND

Power transmission over laser or light enables the transmission of power over a network of optical terminals in remote areas without traditionally built-up power grids or infrastructure. The laser or light used in transmission is generally formed in a beam of narrow angular width. However, the narrow beam also requires that it must be accurately and actively pointed in order to remain aligned to an aperture of an optical terminal at the remote end. This pointing may be accomplished by small mirrors (e.g., MEMS or voice-coil based fast-steering mirror mechanisms) that are actuated to steer the beam or may be otherwise mechanically steered. In other implementations, electro-optic steering of beams with no moving parts is used to steer the beam, which provides cost, lifetime and performance advantages. Optical Phased Arrays (OPAs) are a critical technology component, with added benefits of adaptive-optics, point-to-multipoint support, and mesh network topologies. Each active element in the OPA requires active (thermal, electro-optic, charge injection, etc.) phase shifting capability.

BRIEF SUMMARY

Aspects of the disclosure provide a method of converting power received in one or more optical power beams to electrical power. The method comprising receiving, at an OPA of a first optical terminal, a first optical power beam from a remote optical terminal; determining, by one or more processors of the first optical terminal, a first distribution of the received first optical power beam across a plurality of cells, wherein the plurality of cells are configured to convert power from the from optical power beams to electrical power and, the first distribution is determined based on an initial conversion capability of each of the plurality of cells; distributing, by an optical switch matrix, power from the first optical power beam across the plurality of cells based on the determined first distribution; and converting, by the plurality, at least a portion of the first optical power beam to electrical power.

In one example, the method further includes measuring one or more values associated with the first optical power beam; receiving, at the OPA of the first optical terminal, a second optical power beam from the remote optical terminal; and determining a second distribution of the received second optical power beam across the plurality of cells, wherein the second distribution is based on at least one of the measured one or more values. In an additional example, the method of claim 2, wherein the first optical power beam is received at the OPA of the first optical terminal at a first time step and the second optical power beam is received at the OPA of the first optical terminal at a second time step. In a further example, the second distribution is further based on a threshold value of the plurality of cells. In another example, the threshold value of the plurality of cells is a conversion efficiency.

In another example the first distribution is further based on one or more threshold limits of the plurality of cells. In a further example, the one or more threshold limits of the plurality of cells include at least one of i) optical power density, ii) illumination, and iii) operational temperature.

In an additional example, distributing, by an optical switch matrix, power from the first optical power beam across the plurality of cells based on the determined first distribution includes distributing, by the optical switch matrix, power from the first optical power beam across a plurality of fibers of an optical fiber array based on the first distribution.

Another aspect of the disclosure provides a method of converting power received in one or more optical power beams to electrical power. The method comprising receiving, at an OPA of a first optical terminal, a first optical power beam from a remote optical terminal; determining, by one or more processors of the first optical terminal, a first distribution of the received first optical power beam across a plurality of cells, wherein the plurality of cells are configured to convert optical power to electrical power, and the first distribution is determined based on an initial conversion capability of each of the plurality of cells; distributing, by a target OPA power from the first optical power beam across the plurality of cells based on the determined first distribution, wherein power from the first optical power beam is distributed across the plurality of cells by transmitting, by the target OPA, a first target OPA optical power beam; and converting, by the plurality of cells, at least a portion of the first target OPA optical power beam to electrical power.

In one example, the method further includes measuring one or more values associated with the first optical power beam and the first target OPA optical power beam; receiving, at the OPA of the first optical terminal, a second optical power beam from the remote optical terminal; and determining a second distribution of the received second optical power beam across the plurality of cells, wherein the second distribution is based on at least one of the measured one or more values. In an additional example, first optical power beam is received at the OPA of the first optical terminal at a first time step and the second optical power beam is received at the OPA of the first optical terminal at a second time step. In another example, the second distribution is further based on a threshold value of the plurality of cells. In a further example, the threshold value of the plurality of cells is a conversion efficiency.

In another example, the first distribution is further based on one or more threshold limits of the plurality of cells. In a further example, the one or more threshold limits of the plurality of cells include at least one of i) optical power density, ii) illumination, and iii) operational temperature.

Another aspect of the disclosure provides an optical terminal of a PTOL system. The Optical terminal comprising an optical phased array (OPA) configured to receive one or more optical power beams from one or more remote optical terminals; a plurality of cells, the plurality of cells configured to convert power from the one or more optical power beams to electrical power; an optical switch matrix configured to distribute power of from optical power beams across the plurality of cells; and one or more processors, configured to determine one or more distributions of optical power across the plurality of cells, wherein the one or more distributions are based on an initial conversion capability of each of the plurality of cells.

In one example the optical terminal of further includes one or more sensors configured to measure one or more values relating to the received one or more optical power beams.

In another example, the optical terminal further includes a plurality of fibers of an optical fiber array configured to direct power from the optical switch matrix to the plurality of cells.

In an additional example, the plurality of cells are one of i) semiconductors or ii) thermal energy conversion cells.

Another aspect of the disclosure provides an optical terminal of a PTOL system. The optical terminal comprising: an optical phased array (OPA) configured to receive one or more optical power beams from one or more remote optical terminals; a plurality of cells, the plurality of cells configured to convert power from the one or more optical power beams to electrical power; a target OPA configured to transmit one or more optical power beams to the plurality of cells such that optical power from the received optical power beams is distributed across the plurality of cells; and one or more processors, configured to determine one or more distributions of optical power across the plurality of cells, wherein the one or more distributions are based on an initial conversion capability of each of the plurality of cells.

DETAILED DESCRIPTION

Overview

Figure 1:
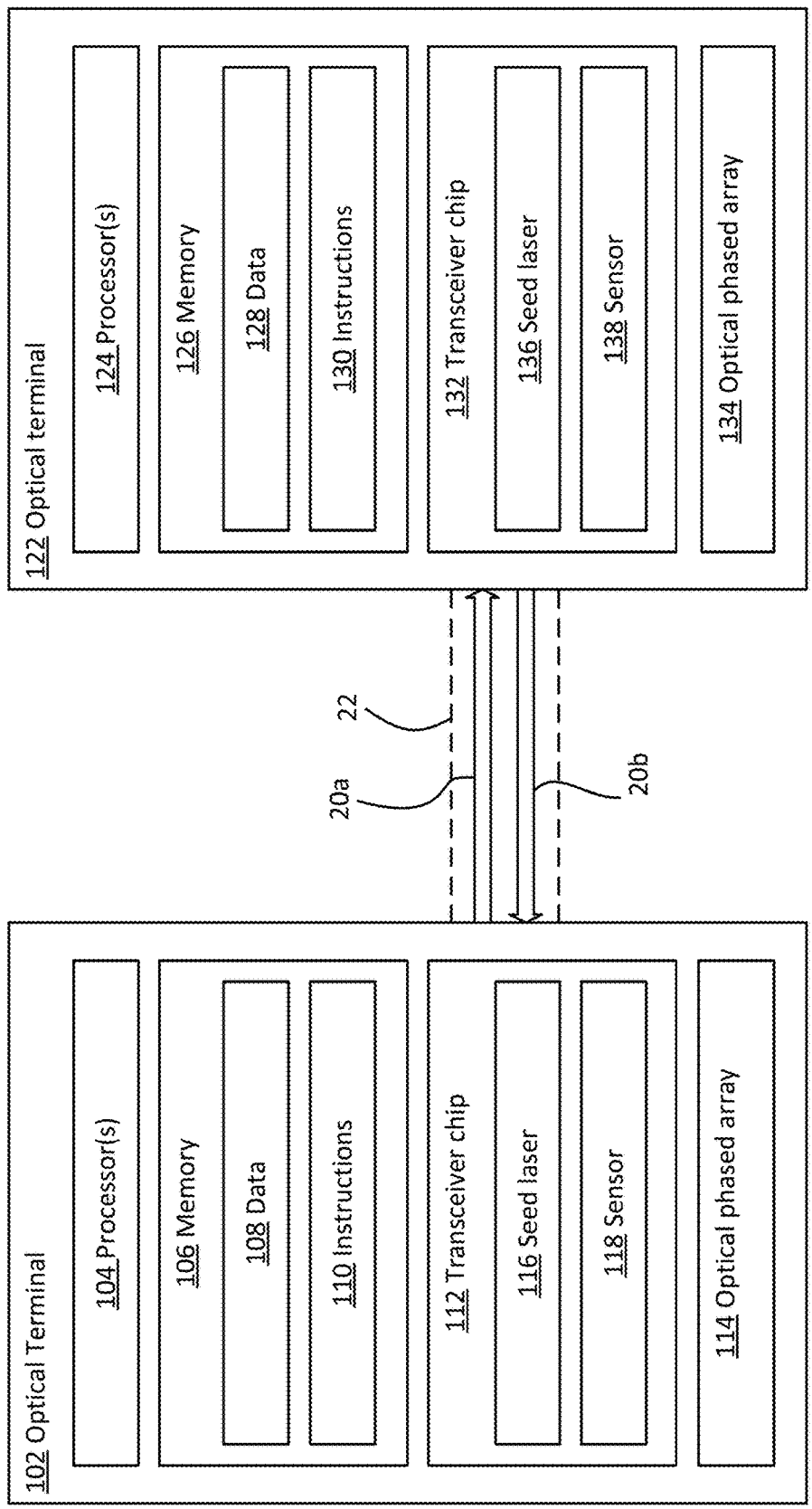
FIG. 1 is a block diagram of a first optical terminal and a second optical terminal in accordance with aspects of the disclosure.

The technology relates to a power transmission over laser or light (PTOL) system and methods utilizing an optical phased array (OPA) architecture in a first optical terminal. The system and methods allow for increased conversion of power of one or more optical power beams to electrical power. The OPA of the PTOL system and methods may be contained on a photonics integrated circuit (PIC).

Generally, PTOL systems do not allow for efficient conversion of power from optical power beams to electrical power. In this regard, a significant amount of power is lost in the conversion. Moreover, such systems utilize complex adaptive optics and deformable mirror systems. Such systems may be high cost, complex, and difficult or unable to scale, and may have difficulty coupling with atmospheric induced aberrations.

To address this, a first optical terminal of a PTOL system may utilize an OPA architecture for increased coupling and distribute power from one or more optical power beams across a plurality of cells of a power conversion array for increased power conversion. The power may be distributed across the power conversion array using an optical switch matrix or a target OPA.

As noted above, a first optical terminal of a PTOL system may utilize an OPA architecture. The OPA architecture may be contained on a photonics integrated circuit (PIC). The OPA architecture may include one or more processors capable of driving the OPA. The first optical terminal may include components to support communication functionality. For example, the first optical terminal may include one or more lenses that form a telescope. The telescope may receive collimated light and output collimated light. Additionally, the first optical terminal may include a reflective surface, the reflective surface configured to reflect one or more optical beams, such as control beams, back the first optical terminal. Additionally, the first optical terminal may include a radio frequency (RF) communications system configured to communicate with one or more remote optical terminals.

The first optical terminal may include components that support conversion of power from one or more optical power beams to electrical power. In this regard, the first optical terminal may include a power conversion array. The power conversion array may or may not be contained on the PIC.

The power conversion array may include a plurality of cells. The plurality of cells configured to convert power from one or more optical power beams to electrical energy. The plurality of cells may be semiconductors, thermal energy conversion cells, etc., or any combination thereof. The plurality of cells may have optical power density, illumination uniformity ranges and operational temperatures for optimal conversion efficiencies. Additionally or alternatively, the plurality of cells may have threshold limits. In this regard, if the threshold limits are exceeded, one or more of the plurality of cells may be damaged. The damage may result in reduced conversion Additionally or alternatively, the plurality of cells of the power conversion array may be configured to direct power from the one or more optical power beams downstream for later conversion to electrical energy. In this regard, the plurality of cells may direct power into a waveguide configuration. The waveguide configuration may allow for the transport of power for downstream power conversion.

When converting power from one or more optical power beams to electrical power, the first optical terminal may distribute power across the plurality of cells of the power conversion array. The distribution of power may be controlled by an optical switch matrix or a target OPA. The optical switch matrix may be configured to distribute power from the one or more optical power beams across the plurality of cells of the power conversion array.

The first optical terminal may include a target OPA. The target OPA may also include components such as a microlens array, a plurality of emitters, a plurality of phase shifters, a plurality of unit cells, and a plurality of super cells. The target OPA may be configured to transmit one or more optical power beams to the plurality of cells. In some instances, the target OPA may be configured to transmit one or more control beams to the plurality of cells.

The first optical terminal may include one or more processors. The one or more processors may include an optical switch control configured to control the optical switch matrix. In this regard, the one or more processors may be configured to determine a distribution of power across the plurality of cells. Moreover, the one or more processors may be configured to send a control signal to the optical switch matrix, the control signal containing the determined distribution.

When converting power from one or more optical power beams to electrical power, the first optical terminal may distribute power across the plurality of cells configured to convert optical power to electrical power. In some instances, the distribution of power may be controlled by the optical switch matrix. In this regard, a method of converting power received in one or more optical power beams to electrical power may include controlling an optical switch matrix.

The first optical terminal may utilize a control loop when converting power from one or more optical power beams to electrical power. In this regard, the control loop may be utilized in determining distributions of received optical power beams across the plurality of cells. In some instances, the control loop may be a feedback control loop which utilizes feedback from one or more sensors of the first optical terminal.

When transmitting and receiving optical power beams, a first optical terminal may be coupled with one or more remote optical terminals. In some instances, coupling with one or more remote optical terminals may include instructing one or more remote optical terminals to drive an OPA thereof to correct for phase error. In one example, the phase error may be due to atmospheric conditions. The atmospheric conditions may include, for example, mount vibration (e.g., jitter), wind, fog, etc.

The features and methodology described herein may provide a PTOL system containing optical terminals with increased coupling and power conversion capabilities. In this regard, such a PTOL system allows for a lower cost, less complex, and scalable system and methodology for conversion of power from one or more optical beams to electrical power. The PTOL system described provides a much broader utilization range over variable real-world operating conditions. Changes in the distance and pose angle between the transmitter and receiver, as well as the large variation in the on receiver optical power levels for example resulting from environmental factors such as fog, haze, rain, snow can be accommodated by its dynamic feedback control.

Example Systems

As noted above, a first optical terminal of a PTOL system may utilize an OPA architecture. The OPA architecture may be contained on a photonics integrated circuit (PIC). The OPA architecture may include one or more processors capable of driving the OPA. The first optical terminal may include components to support communication functionality. For example, the first optical terminal may include one or more lenses that form a telescope. The telescope may receive collimated light and output collimated light. The telescope may include a magnification portion and a relay portion. Additionally, the first optical terminal may include a reflective surface, the reflective surface configured to reflect one or more optical beams, such as control beams, back the first optical terminal. Additionally, the first optical terminal may include a radio frequency (RF) communications system configured to communicate with one or more remote optical terminals.

Figure 2:
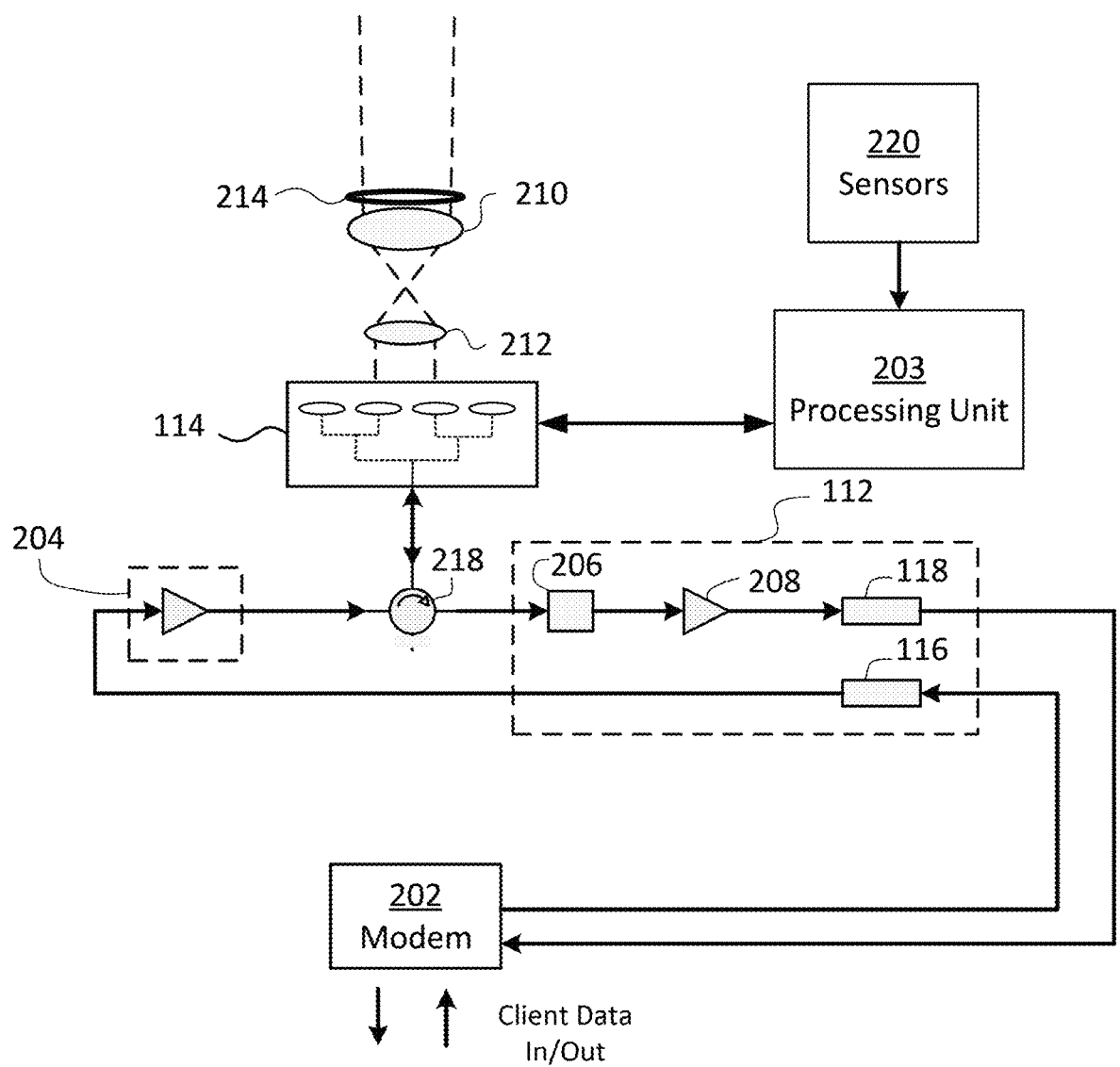
FIG. 2 is a pictorial diagram of an example system architecture for the first optical terminal of FIG. 1 in accordance with aspects of the disclosure.

FIG. 1 is a block diagram 100 of a first optical terminal configured to form one or more links with a second optical terminal. FIG. 2 is a pictorial diagram 200 of an example terminal, such as the first optical terminal of FIG. 1. For example, a first optical terminal 102 includes one or more processors 104, a memory 106, a transceiver photonic integrated chip 112, and an optical phased array (OPA) architecture 114. In some implementations, the first optical terminal 102 may include more than one transceiver chip and/or more than one OPA architecture (e.g., more than one OPA chip).

The one or more processors 104 may be any conventional processors, such as commercially available CPUs. Alternatively, the one or more processors may be a dedicated device such as an application specific integrated circuit (ASIC) or another hardware-based processor, such as a field programmable gate array (FPGA). Although FIG. 1 functionally illustrates the one or more processors 104 and memory 106 as being within the same block, such as in a modem 202 for digital signal processing shown in FIG. 2, the one or more processors 104 and memory 106 may actually comprise multiple processors and memories that may or may not be stored within the same physical housing, such as in both the modem 202 and a separate processing unit 203. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each terminal, such as memory 106, calibration information, such as one or more offsets determined for tracking a signal, may be stored.

Data 108 may be retrieved, stored or modified by one or more processors 104 in accordance with the instructions 110. For instance, although the system and method are not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps including grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transceiver chip 112. As shown in FIG. 2, the one or more processors in the modem 202 may be in communication with the transceiver chip 112, being configured to receive and process incoming optical signals and to transmit optical signals. The transceiver chip 112 may include one or more transmitter components and one or more receiver components. The one or more processors 104 may therefore be configured to transmit, via the transmitter components, data in a signal, and also may be configured to receive, via the receiver components, communications and data in a signal. The received signal may be processed by the one or more processors 104 to extract the communications and data.

The transmitter components may include a light source, such as seed laser 116. Other transmitter components may include an amplifier, such as a high-power semiconductor optical amplifier 204. In some implementations, the amplifier is on a separate photonics chip. The seed laser 116 may be a distributed feedback laser (DFB), a laser diode, a fiber laser, or a solid-state laser. The light output of the seed laser 116, or optical signal, may be controlled by a current, or electrical signal, applied directly to the seed laser, such as from a modulator that modulates a received electrical signal. Light transmitted from the seed laser 116 is received by the OPA architecture 114.

The receiver components may also include sensor 118, such as a photodiode. The sensor may convert a received signal (e.g., light or optical communications beam), into an electrical signal that can be processed by the one or more processors. Other receiver components may include an attenuator, such as a variable optical attenuator 206, an amplifier, such as a semiconductor optical amplifier 208, or a filter.

The one or more processors 104 may be in communication with the OPA architecture 114. The OPA architecture 114 may include a micro-lens array, an emitter (e.g., optical antenna) associated with each micro-lens in the array, a plurality of phase shifters, and waveguides that connect the components in the OPA. The OPA architecture may be positioned on a single chip, an OPA chip. The waveguides progressively merge between a plurality of emitters and an edge coupler that connect to other transmitter and/or receiver components. In this regard, the waveguides may direct light between photodetectors or fiber outside of the OPA architecture, the phase shifters, the waveguide combiners, the emitters and any additional component within the OPA. In particular, the waveguide configuration may combine two or more waveguides at each stage, which means the number of waveguides is reduced by a factor of two or more at every successive stage closer to the edge coupler. The point of combination may be a node, and a combiner may be at each node. The combiner may be a N×N multimode interference (MMI) or directional coupler.

The OPA architecture 114 may receive light from the transmitter components and outputs the light as a coherent communications beam to be received by a remote terminal or client device, such as second optical terminal 122. The OPA architecture 114 may also receive light from free space, such as a communications beam from second optical terminal 122, and provides such received light to the receiver components. The OPA architecture may provide the necessary photonic processing to combine an incoming optical communications beam into a single-mode waveguide that directs the beam towards the transceiver chip 112. In some implementations, the OPA architecture may also generate and provide an angle of arrival estimate to the one or more processors 104, such as those in processing unit 203.

The first optical terminal 102 may include additional components to support functions of the optical terminal. For example, the first optical terminal may include one or more lenses and/or mirrors that form a telescope. The telescope may receive collimated light and output collimated light. The telescope may include a magnification portion, and a relay portion. As shown in FIG. 2, the first optical terminal may include a telescope including an objective lens 210, an eyepiece lens 212, and an aperture 214 (or opening) through which light may enter and exit the optical terminal. For ease of representation and understanding, the aperture 214 is depicted as distinct from the objective lens 210, though the objective lens 210 may be positioned within the aperture. The first optical terminal may include a circulator or wavelength splitter, such as a single mode circulator 218, that routes incoming light and outgoing light while keeping them on at least partially separate paths. The first optical terminal may include one or more sensors 220 for detecting measurements of environmental features and/or system components.

The first optical terminal 102 may include one or more steering mechanisms, such as one or more bias means for controlling one or more phase shifters, which may be part of the OPA architecture 114, and/or an actuated/steering mirror (not shown), such as a fast/fine pointing mirror. In some examples, the actuated mirror may be a MEMS 2-axis mirror, 2-axis voice coil mirror, or a piezoelectric 2-axis mirror. The one or more processors 104, such as those in the processing unit 203, may be configured to receive and process signals from the one or more sensors 220, the transceiver chip 112, and/or the OPA architecture 114 and to control the one or more steering mechanisms to adjust a pointing direction and/or wavefront shape. The first optical terminal also includes optical fibers or waveguides connecting optical components, creating a path between the seed laser 116 and OPA architecture 114 and a path between the OPA architecture 114 and the sensor 118.

Returning to FIG. 1, the second optical terminal 122 may output transmission (Tx) signals as an optical communications beam 20b (e.g., light) pointed towards the first optical terminal 102, which receives the optical communications beam 20b (e.g., light) as corresponding receive (Rx) signals. In this regard, the second optical terminal 122 includes one or more processors, 124, a memory 126, a transceiver chip 132, and an OPA architecture 134. The one or more processors 124 may be similar to the one or more processors 104 described above.

Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transceiver chip 132 and the OPA architecture 134 of the second optical terminal 122 may be similar to the transceiver chip 112 and the OPA architecture 114. The transceiver chip 132 may include both transmitter components and receiver components. The transmitter components may include a light source, such as seed laser 136 configured similar to the seed laser 116. Other transmitter components may include an amplifier, such as a high-power semiconductor optical amplifier. The receiver components may include a sensor 138 configured similar to sensor 118. Other receiver components may include an attenuator, such as a variable optical attenuator, an amplifier, such as a semiconductor optical amplifier, or a filter. The OPA architecture 134 may include an OPA chip including a micro-lens array, a plurality of emitters, a plurality of phase shifters. Additional components for supporting functions of the second optical terminal 122 may be included similar to the additional components described above. The second optical terminal 122 may have a system architecture that is same or similar to the system architecture shown in FIG. 2.

Figure 3:
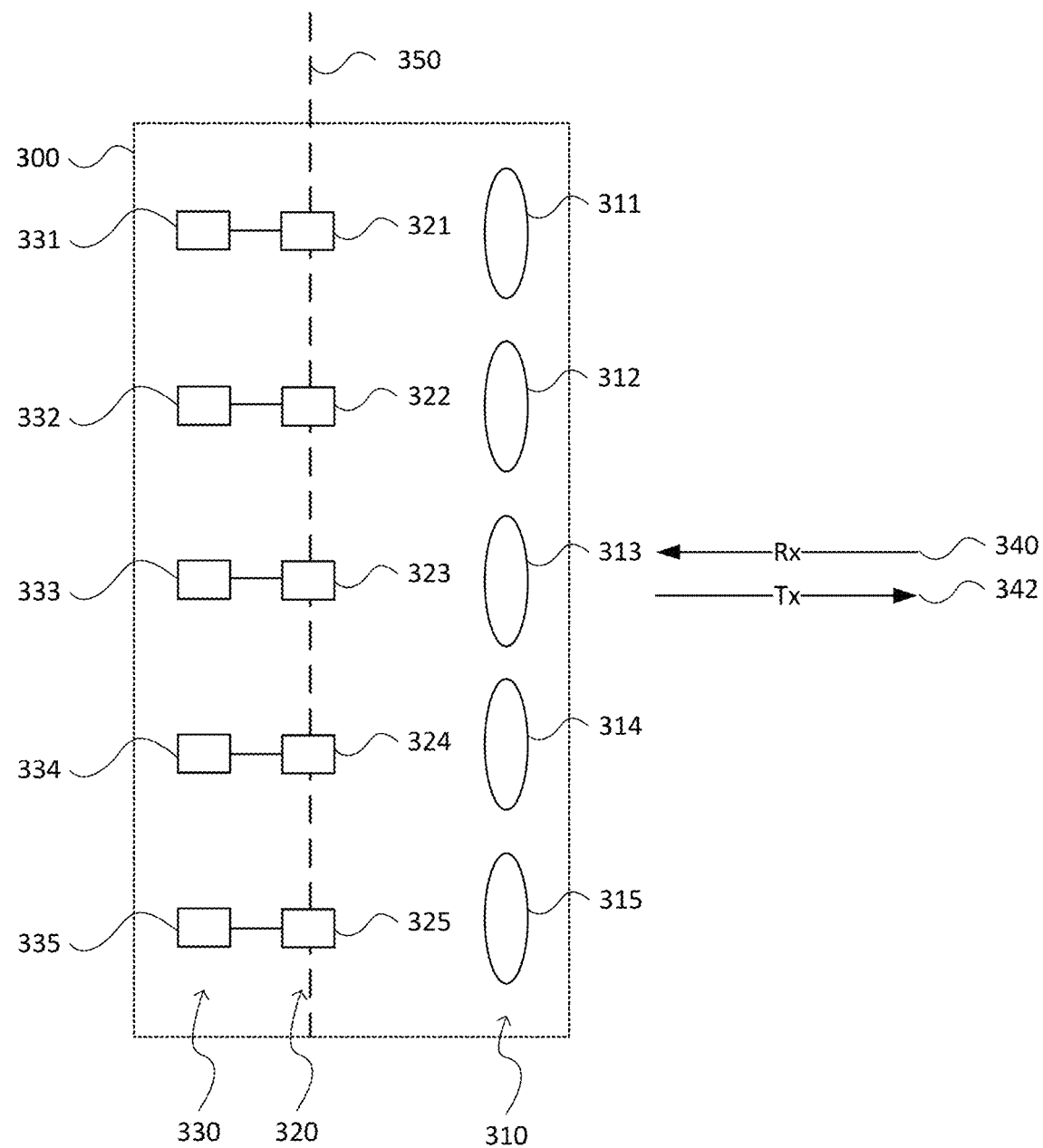
FIG. 3 represents features of an OPA architecture represented as an example OPA chip in accordance with aspects of the disclosure.

FIG. 3 represent features of OPA architecture 114 represented as an example OPA chip 300 including representations of a micro-lens array 310, a plurality of emitters 320 (e.g. optical antennas), and a plurality of phase shifters 330. For clarity and ease of understanding, additional waveguides and other features are not depicted. Arrows 340, 342 represent the general direction of Tx signals (transmitted optical beams) and Rx signals (received optical beams) as such signals pass or travel through the OPA chip 300.

The micro-lens array 310 may include a plurality of convex, refractive, diffractive or meta-lens micro-lenses 311-315 that focus the Rx signals onto respective ones of the plurality emitters positioned at the focal points of the micro-lens array. In this regard, the dashed-line 350 represents the focal plane of the micro-lenses 311-315 of the micro-lens array 310. The micro-lens array 310 may be arranged in a grid pattern with a consistent pitch, or distance, between adjacent lenses. In other examples, the micro-lens array 310 may be in different arrangements having different numbers of rows and columns, different shapes, and/or different pitch (consistent or inconsistent) for different lenses.

Each micro-lens of the micro-lens array may be 10's to 1000's of micrometers in diameter and height. In addition, each micro-lens of the micro-lens array may be manufactured by molding, printing, or etching a lens directly into a wafer of the OPA chip 300. Alternatively, the micro-lens array 310 may be molded, printed, or etched as a separately fabricated micro-lens array. In this example, the micro-lens array 310 may be a rectangular or square plate of glass or silica a few mm (e.g., 10 mm or more or less) in length and width and 0.2 mm or more or less thick. Integrating the micro-lens array within the OPA chip 300 may allow for the reduction of the grating emitter size and an increase in the space between emitters. In this way, two-dimensional waveguide routing in the OPA architecture may better fit in a single layer optical phased array. In other instances, rather than a physical micro-lens array, the function of the micro-lens array may be replicated using an array of diffractive optical elements (DOE).

Each micro-lens of the micro-lens array may be associated with a respective emitter of the plurality of emitters 320. For example, each micro-lens may have an emitter from which Tx signals are received and to which the Rx signals are focused. As an example, micro-lens 311 is associated with emitter 321. Similarly, each micro-lens 312-315 also has a respective emitter 322-325. In this regard, for a given pitch (i.e., edge length of a micro-lens) the micro-lens focal length may be optimized for best transmit and receive coupling to the underlying emitters. This arrangement may thus increase the effective fill factor of the Rx signals at the respective emitter, while also expanding the Tx signals received at the micro-lenses from the respective emitter before the Tx signals leave the OPA chip 300.

The plurality of emitters 320 may be configured to convert emissions from waveguides to free space and vice versa. The emitters may also generate a specific phase and intensity profile to further increase the effective fill factor of the Rx signals and improve the wavefront of the Tx signals. The phase and intensity profile may be determined using inverse design or other techniques in a manner that accounts for how transmitted signals will change as they propagate to and through the micro-lens array. The phase profile may be different from the flat profile of traditional grating emitters, and the intensity profile may be different from the gaussian intensity profile of traditional grating emitters. However, in some implementations, the emitters may be Gaussian-like field profile grating emitters.

The phase shifters 330 may allow for sensing and measuring Rx signals and the altering of Tx signals to improve signal strength optimally combining an input wavefront into a single waveguide or fiber. Each emitter may be associated with a phase shifter. As shown in FIG. 3, each emitter may be connected to a respective phase shifter. As an example, the emitter 320 is associated with a phase shifter 330. The Rx signals received at the phase shifters 331-335 may be provided to receiver components including the sensor 118, and the Tx signals from the phase shifters 331-335 may be provided to the respective emitters of the plurality of emitters 320. The architecture for the plurality of phase shifters 330 may include at least one layer of phase shifters having at least one phase shifter connected to an emitter of the plurality of emitters 320. In some examples, the phase shifter architecture may include a plurality of layers of phase shifters, where phase shifters in a first layer may be connected in series with one or more phase shifters in a second layer.

Each phase shifter emitter pair as illustrated in FIG. 3 may define a unit cell of the OPA. For example, the pairs of phase shifter 331 and emitter 321, phase shifter 332 and emitter 322, phase shifter 333 and emitter 323, phase shifter 333 and emitter 323, phase shifter 334 and emitter 324, and phase shifter 335 and emitter 325 may each define a unit cell of the OPA chip 300. Moreover, a super cell of the OPA may include a plurality of unit cells.

A communication link 22 may be formed between the first optical terminal 102 and the second optical terminal 122 when the transceivers of the first and second optical terminals are aligned. The alignment can be determined using the optical communications beams 20a, 20b to determine when line-of-sight is established between the terminals 102, 122. Using the communication link 22, the one or more processors 104 can send communication signals using the optical communications beam 20a to the second optical terminal 122 through free space, and the one or more processors 124 can send communication signals using the optical communications beam 20b to the first optical terminal 102 through free space. The communication link 22 between the first and second optical terminals 102, 122 allows for the bi-directional transmission of data between the two devices. In particular, the communication link 22 in these examples may be free-space optical communications (FSOC) links. In other implementations, one or more of the communication links 22 may be radio-frequency communication links or other type of communication link capable of traveling through free space.

The first optical terminal may include components that support transmitting and receiving power via one or more optical power beams. The first optical terminal may additionally include components that allow for conversion of electrical power to and from the one or more optical power beams.

Figure 4A:
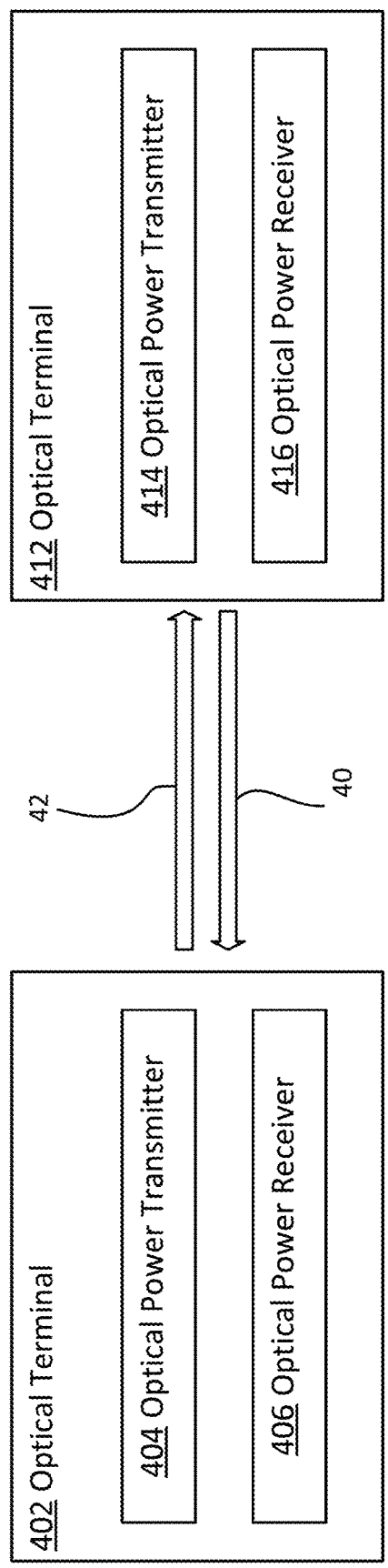
FIG. 4a is a block diagram of a first optical terminal and a second optical terminal in accordance with aspects of the disclosure.

FIG. 4a is a block diagram 400a of the first optical terminal 402 configured to transmit and receive optical power with a second optical terminal, for instance as part of a system such as PTOL system. The first optical terminal 402 may include the components of the first optical terminal 102 discussed above. For example, a first optical terminal 402 includes an optical power transmitter 404 and an optical power receiver 406. Similarly, a second optical terminal 412 includes an optical power transmitter 414 and an optical power receiver 416. Additionally the second optical terminal 412 may include the components of the second optical terminal 122 discussed above. The first optical terminal 402 may be configured to transmit one or more optical power beams 42 via the optical power transmitter 404 to a remote optical terminal (e.g., the second optical terminal 412 or another optical terminal). The first optical terminal 402 may be further configured to receive one or more optical power beams 40 from the remote optical terminal via the optical power receiver 406.

Similarly, the second optical terminal 412 may be configured to transmit one or more optical power beams 40 via the optical power transmitter 414 to a remote optical terminal (e.g., first optical terminal 402 or another optical terminal). The second optical terminal 412 may be further configured to receive one or more optical power beams 42 from the remote optical terminal via the optical power receiver 416.

The optical terminals 402, 412 may include a plurality of optical power transmitters 404, 414 and a plurality of optical power receivers 406, 416. In this regard, each of the plurality of optical power transmitters and receivers may be disposed on differing portions of the first optical terminal 402 and second optical terminal 412. Each of the plurality of optical power transmitters and receivers may be configured to transmit and receive one or more optical power beams with differing remote optical terminals as part of a PTOL system containing a plurality of optical terminals.

Figure 4B:
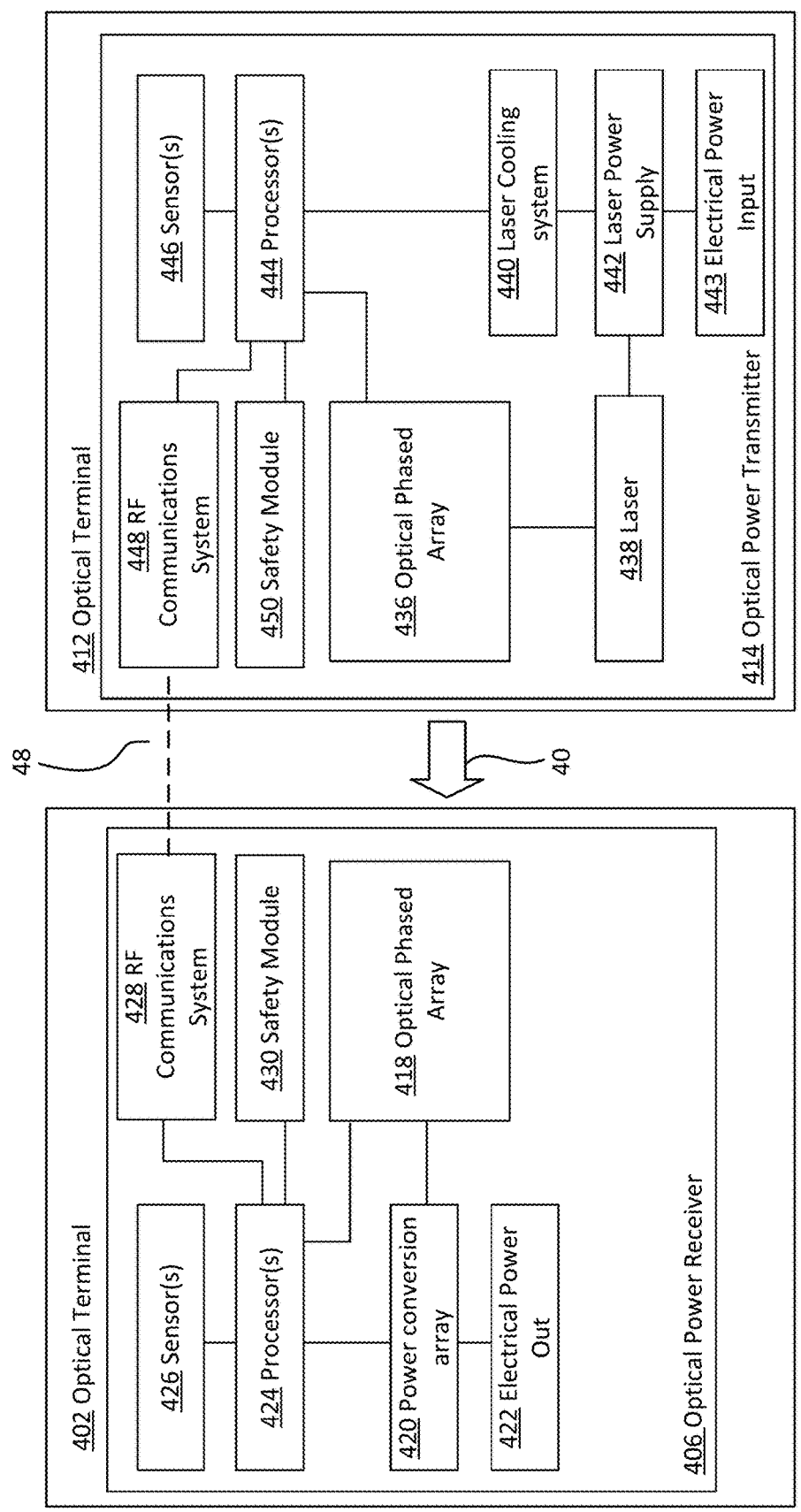
FIG. 4b is another block diagram of a first optical terminal and a second optical terminal in accordance with aspects of the disclosure.

FIG. 4b is a block diagram 400b of example optical terminals with transmit and receive components, such as the first optical terminal 402 and the second optical terminal 412 of FIG. 4a and/or the first optical terminal 102 and second optical terminal 122 of FIG. 1. In this regard, FIG. 4b illustrates components of the optical power receiver 406 of the first optical terminal 402 and components of optical power transmitter 414 of the second optical terminal 412. While the optical terminals of FIG. 4b each only illustrate either optical power receiver or transmitter components, each of the first optical terminal 402 and the second optical terminal 412 may include optical transmitter and receiver components.

The optical power receiver 406 of the first optical terminal 402 may include an OPA 418, a power conversion array 420, an power output 422, one or more sensors 426, one or more processors 424, an RF communications system 428, and a safety module 430. The OPA 418 may be configured to receive one or more optical power beams such as optical power beam 40. The OPA 418 may include components discussed above such as a micro-lens array, a plurality of emitters, and a plurality of phase shifters.

The power conversion array 420 may include an array of a plurality of cells configured to convert power from one or more optical power beams to electrical power. In some implementations, the plurality of cells of the power conversion array 420 may be arranged in an n×m array or an n×n array of cells. In some implementations, the plurality of cells of the power conversion array 420 may be arranged in a circular array of cells. The plurality of cells of the power conversion array 420 may be semiconductors (e.g., photovoltaics), thermal energy conversion cells, etc., or any combination thereof. The plurality of cells of the power conversion array 420 may have optical power density ranges, illumination ranges, and/or operational temperature ranges in which optical power is converted with reduced loss. Additionally or alternatively, the plurality of cells may have one or more threshold limits corresponding to optical power density, illumination, and/or operational temperature. In this regard, if the one or more threshold limits are exceeded, one or more of the plurality of cells of the power conversion array 420 may be damaged. The damage may result in reduced conversion ability. In this regard, exceeding the threshold limits may result in the one or more cells functioning below a threshold value. For example, one of the one or more threshold limits of the plurality of cells may be a temperature limit of 38° C. Additionally, the threshold value of the plurality of cells may be a conversion efficiency of 10%. In such an example, if the temperature of one of the plurality of cells reaches a temperature 38° C. or higher, the one of the plurality of cells may become damaged. The damage of the one of the plurality of cells may result in the conversion efficiency of the cell decreasing to 10% or lower.

The power conversion array 420 may include an optical switch matrix. The optical switch matrix may include a plurality of switches configured to distribute power from the one or more optical power beams across the plurality of cells of the power conversion array 420. The switch matrix may consist of a cascaded 1×2 multi-mode interference (MMI) coupler array or a single 1×n MMI. The MMI may utilize thermal-optic, charge injection, electro-optic, phase change technologies or a combination thereof as the plurality of switches.

The power conversion array 420 may be configured to output electrical power to the power output 422. The power output 422 may be a connection to an external network for distributing power (e.g., power grid), a battery for storing electrical power, etc. In some instances, the power conversion array 420 may be disposed external to the first optical terminal 402. In this regard, the power output 422 may be configured to direct power from the one or more optical power beams downstream to the external power conversion array for later conversion to electrical energy. In this regard, the power output 422 may direct optical power via a waveguide (e.g., optical fiber) configuration.

In some instances, the power conversion array 420 may include a target OPA. The target OPA may also include components discussed above such as a micro-lens array, a plurality of emitters, a plurality of phase shifters, a plurality of unit cells, and a plurality of super cells. In this regard, the target OPA may be configured in the same or similar manner as OPA architecture 114 discussed above. The target OPA may be configured to transmit one or more optical power beams to the plurality of cells. Additionally or alternatively, the target OPA may be configured to transmit one or more control beams to the plurality of cells.

In some instances, the one or more sensors 426 may include a plurality of sensors coupled to cells of the OPA 418 and/or the target OPA of the power conversion array 420. The plurality of sensors may be coupled to a plurality of unit cells of the OPA 418 and/or the target OPA of the power conversion array 420 or a plurality of super cells of the OPA 418 and/or the target OPA of the power conversion array 420. In this regard, each sensor of the plurality of sensors may be coupled to a unit cell or a super cell of the plurality of unit cells or plurality of super cells respectively. The plurality of sensors may be configured to measure one or more values such as the power received at each of the plurality of unit cells of the OPA 418 and/or the target OPA of the power conversion array 420, the power received at each of the plurality of super cells of the OPA 418 and/or the target OPA of the power conversion array 420, the total power received by the cells of the OPA 418 and/or the target OPA of the power conversion array 420, or any combination thereof. In such an example, the plurality of sensors may be an array of photodiodes.

In some instances, the one or more sensors 426 may include a plurality of sensors coupled to a plurality of cells of the power conversion array 420. In this regard, each sensor of the plurality of sensors may be coupled to a cell (e.g., photovoltaic, etc.) of the power conversion array 420. The plurality of sensors may be configured to measure one or more values such as an amount of optical power distributed to each of the plurality of cells of the power conversion array 420 and/or an amount of electrical power converted or output by each of the plurality of cells of the power conversion array 420.

In some instances, the one or more sensors 426 may include a sensor coupled to the power output 422. In such an example, the sensor coupled to the power output 422 may be configured to collect one or more values including the total power output by the power conversion array 420.

In some instances, the one or more sensors 426 may include one or more cameras (e.g., visible cameras, near infrared cameras, thermal camera etc.) operatively coupled to the power conversion array 420. The one or more cameras may be configured to detect one or more values. The one or more values may be illumination distributed to each of the plurality of cells. In some instances, the one or more values may be temperature distributed to each of the plurality of cells. In this regard, the one or more cameras may be used to detect overlap and/or uniformity of the optical beam on the power conversion array 420, the temperature distribution on the power conversion array 420, or both.

In some instances, the one or more sensors 426 may include one or more environmental temperature sensors (e.g., semiconductor thermistors, optical ring resonators, etc.). The one or more temperature sensors may be used to measure the local temperature in the environment of the first optical terminal 402.

In some instances, the one or more sensors 426 may include sensors such as an internal measurement unit (IMU), an accelerometer, and global positional system (GPS), etc. In this regard, the one or more sensors 426 may be configured to provide one or more values related to the status of the first optical terminal 402 (e.g., position, acceleration, platform jitter, etc.). In some instances, the one or more sensors 426 may include a wavefront sensor. In some instances, the wavefront sensor may be coupled to the OPA 418 and/or the target OPA of the power conversion array 420.

The one or more processors 424 may be configured the same or similarly to the one or more processors 104. The one or more processors 424 may include an OPA controller configured to drive the plurality of phase shifters of the OPA 418. The OPA controller may additionally be configured to control the plurality of emitters of the OPA 418. In some instances, the one or more processors 424 may include an optical switch controller configured to control components of the power conversion array 420, such as the optical switch matrix. In this regard, the one or more processors 424 may be configured to determine a distribution of power across the plurality of cells. Additionally, the one or more processors 424 may be configured to send a control signal to the optical switch matrix, the control signal containing the determined distribution.

The optical power receiver 406 of the first optical terminal 402 includes a safety module 430. The safety module 430 may detect interruptions in a transmitted monitor beam. The transmitted monitor beam may be transmitted with the one or more optical power beams. The monitor beam may be an outer annular monitor beam or nested layers of annulus beams where the one or more optical power beams may occupy the central portion of a monitor annulus. The monitor beam may be eye-safe and may be at visible wavelengths to provide visual identification of the PTOL beam spatial location. In one example, where the monitor beam is a single annulus monitor beam, if the safety module 430 detects an interruption in the monitor beam, the one or more power beams may then be reduced to eye-safe levels. In another example, where the monitor beam is a nested annulus monitor beam, if the safety module 430 detects two or more sequential interruptions in the monitor beam, the one or more power beams may then be reduced to eye-safe levels. In this regard, the nested annulus monitor beam may allow for less reductions of power for a false interruption, the safety module 430 will only reduce the power level of the one or more power beams when two or more sequential interruptions are detected.

The RF communications system 428 of the first optical terminal 402 may be configured to transmit and receive RF signals 48 with the RF communications system 448 of the second optical terminal 412. Similarly, the RF communications system 448 of the second optical terminal 412 may be configured to transmit and receive RF signals 48 with the RF communications system 428 of the first optical terminal 402.

The optical power transmitter 414 of the second optical terminal 412 may include an OPA 436, a laser 438, a laser cooling system 440, a laser power supply 442, electrical power input 443, one or more processors 444, one or more sensors 446, an RF communications system, and a safety module 450. The OPA 436 may be configured to transmit one or more optical power beams such as optical power beam 40. The OPA 436 may include components discussed above such as a micro-lens array, a plurality of emitters, and a plurality of phase shifters.

The OPA 436 of the optical power transmitter 414 is configured to transmit one or more optical power beams 40. The one or more optical power beams 40 may be received at the OPA 418 of the optical power receiver 406. Electrical power may enter the optical power transmitter 414 of the second optical terminal 412 via the electrical power input 443. The electrical power input 443 may be a connection to an external network for distributing power (e.g., power grid), a battery for storing electrical power, etc. In this regard, the electrical power input 443 may include one or more cables capable of transmitting electrical power.

The laser power supply 442 may be operatively coupled to the electrical power input 443. The laser power supply 442 may be a direct current (DC) power supply. In this regard the laser power supply 442 may convert alternating current (AC) power from the electrical power input 443 to DC power.

The laser 438 may be operatively coupled to the OPA 436 and the laser power supply 442. In this regard, the laser 438 may receive power from the laser power supply 442 and produce one or more optical power beams for transmission via the OPA 436. The The laser cooling system 440 may be operatively coupled to the laser power supply 442 and the laser 438. In this regard the laser cooling system 440 may be configured to cool the laser 438 and laser power such that a temperature of each thereof may be maintained in a desired operational temperature range.

The one or more processors 444 may be configured the same or similarly to the one or more processors 104 and the one or more processors 424. The one or more processors 444 may include an OPA controller configured to drive the plurality of phase shifters of the OPA 436. The OPA controller may additionally be configured to control the plurality of emitters of the OPA 436. In some instances, the one or more processors 444 may include a laser controller. In this regard, the laser controller of the one or more processors 444 may be configured to direct the laser 438 to generate one or more optical power beams.

The one or more sensors 446 may include sensors such as an internal measurement unit (IMU), an accelerometer, and global positional system (GPS), etc. In this regard, the one or more sensors 446 may be configured to provide one or more values related to the status of the second optical terminal 412 (e.g., position, acceleration, platform jitter, etc.). In some instances, the one or more sensors 446 may include a wavefront sensor. In some instances, the wavefront sensor may be coupled to the OPA 436.

The optical power transmitter 414 of the second optical terminal 412 includes a safety module 450. The safety module 450 may detect interruptions in a reflected back monitor beam. The reflected back monitor beam may be transmitted with the one or more optical power beams. The monitor beam may be configured in the same manner as discussed above. The safety module 450 may detect interruptions in the monitor beam in the same manner as safety module 430.

Figure 5A:
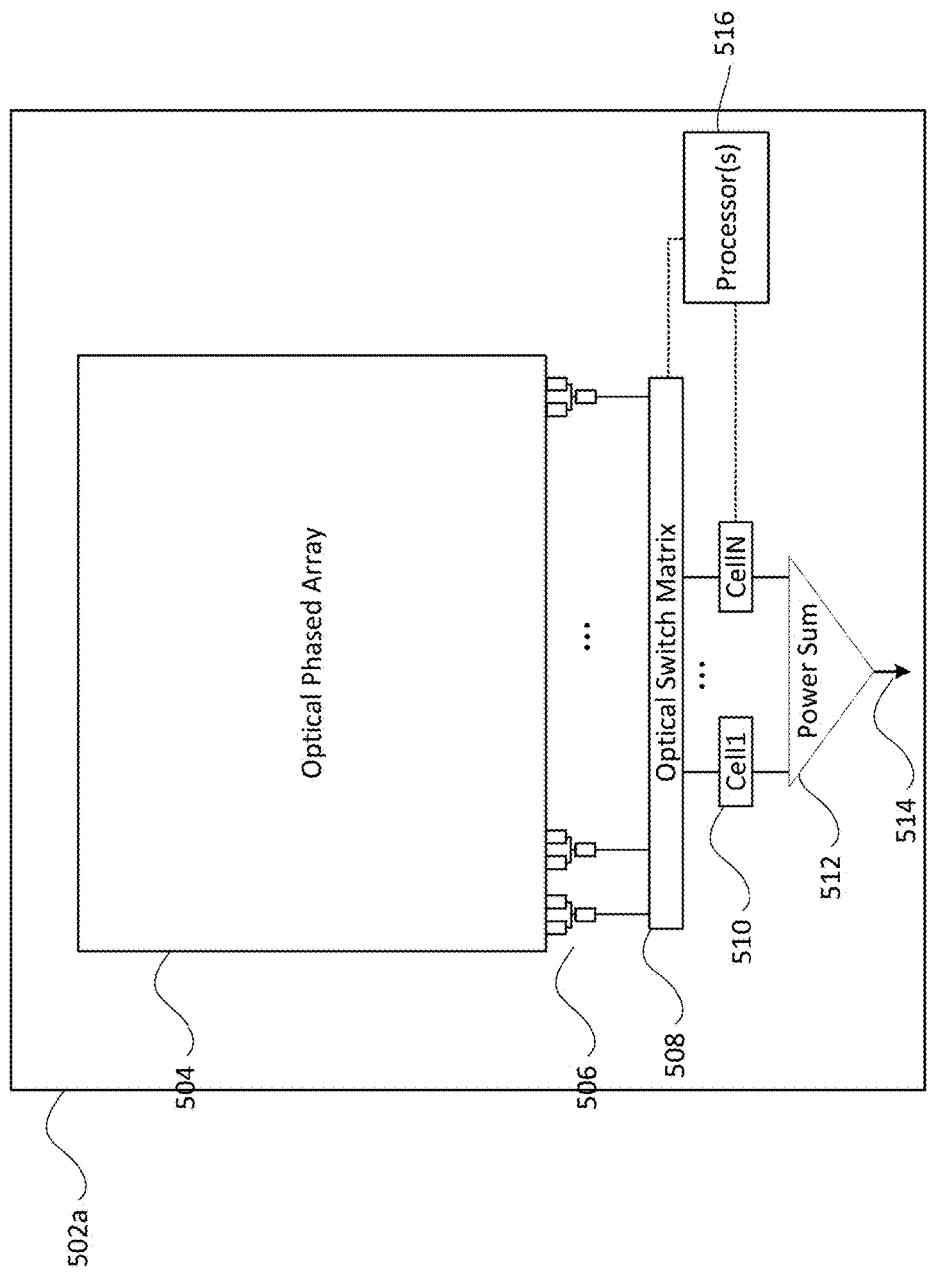
FIGS. 5a-5d provide example configurations of portions of an optical power receiver of an optical terminal.

FIGS. 5a-5d illustrate several example configurations of portions of an optical power receiver of an optical terminal, such as optical power receivers 406, 416. FIG. 5a illustrates an example of a PIC 502a of an optical power receiver 500a with a power conversion module contained thereon. The PIC 502a of an optical terminal illustrated in FIG. 5a includes a receiver OPA 504, a plurality of waveguide configurations 506, an optical switch matrix 508 (which may be configured the same or similar to the optical switch matrix of the power conversion array 420 described above), a plurality of cells 510, power summation electronics 512, a power output 514, and one or more processors 516.

The receiver OPA 504 may be configured to receive one or more optical power beams. The receiver OPA 504 may include components discussed above such as a micro-lens array, a plurality of emitters, and a plurality of phase shifters. In this regard, the receiver OPA 504 may be configured in the same or similar manner as OPA architecture 114 and the target OPA of the power conversion array 420 discussed above. The receiver OPA 504 may be coupled to a plurality of waveguide configurations 506 that combine two or more waveguides at each stage. As such, in this example, the number of waveguides is reduced by a factor of two or more at every successive stage closer to the edge coupler. The point of combination may be a node, and a combiner may thus be arranged at each node. Each combiner may be a N×N multimode interference (MMI) or directional coupler.

The plurality of waveguide configurations 506 may be coupled to and configured to direct one or more received optical power beams to the optical switch matrix 508. The optical switch matrix 508 may include a plurality of switches configured to distribute power from the one or more optical power beams across the plurality of cells 510. The switch matrix may consist of a cascaded 1×2 multimode interference (MMI) coupler array or a single 1×n MMI. The MMI may utilize thermal-optic, charge injection, electro-optic, phase change technologies or a combination thereof as the plurality of switches.

The one or more processors 516 may be configured in the same or similar manner as the one or more processors 104, the one or more processors 424, and the one or more processors 444. The one or more processors 516 may include an OPA controller configured to drive the plurality of phase shifters of the receiver OPA 504. In some instances, the one or more processors 516 may include an optical switch controller configured to control the optical switch matrix 508. In this regard, the one or more processors 516 may be configured to determine a distribution of power across the plurality of cells 510. The distribution may be determined based on one or more electrical performance metrics (e.g., the one or more values discussed above) and/or a comparison thereof. Additionally, the one or more processors 516 may be configured to send a control signal to the optical switch matrix 508, the control signal containing the determined distribution.

The plurality of cells 510 may be configured the same or similarly as the plurality of cells of the power conversion array 420. In this regard, the plurality of cells 510 may be configured to convert power from the one or more optical power beams to electrical power. In some implementations, plurality of cells may be arranged in an n×m array or an n×n array of cells. In some implementations, the plurality of cells 510 may be arranged in a circular array of cells. The plurality of cells 510 may be semiconductors (e.g., photovoltaics), thermal energy conversion cells, etc., or any combination thereof. The plurality of cells 510 may have optical power density ranges, illumination ranges, and/or operational temperature ranges in which optical power is converted with reduced loss. Additionally or alternatively, the plurality of cells 510 may have one or more threshold limits corresponding to optical power density, illumination, and/or operational temperature. In this regard, if the one or more threshold limits are exceeded, one or more of the plurality of cells 510 may be damaged. The damage may result in reduced conversion ability. As such, exceeding the threshold limits may result in the one or more cells 510 functioning below a threshold value. For example, one of the one or more threshold limits of the plurality of cells 510 may be a temperature limit of 38° C. In this example, the threshold value of the plurality of cells may be a conversion efficiency of 10%. In such an example, if the temperature of one of the plurality of cells 510 reaches a temperature 38° C. or higher, the one of the plurality of cells 510 may become damaged. The damage of the one of the plurality of cells 510 may result in the conversion efficiency of the cell decreasing to 10% or lower.

The power summation electronics 512 may be configured to receive the power converted by the plurality of cells 510 and sum the converted power and direct it towards the power output 514. The power output 514 may be configured to output the converted electrical power. In this regard the power output 514 may be a connection to an external network for distributing power (e.g., power grid), a battery for storing electrical power, etc.

Figure 5B:
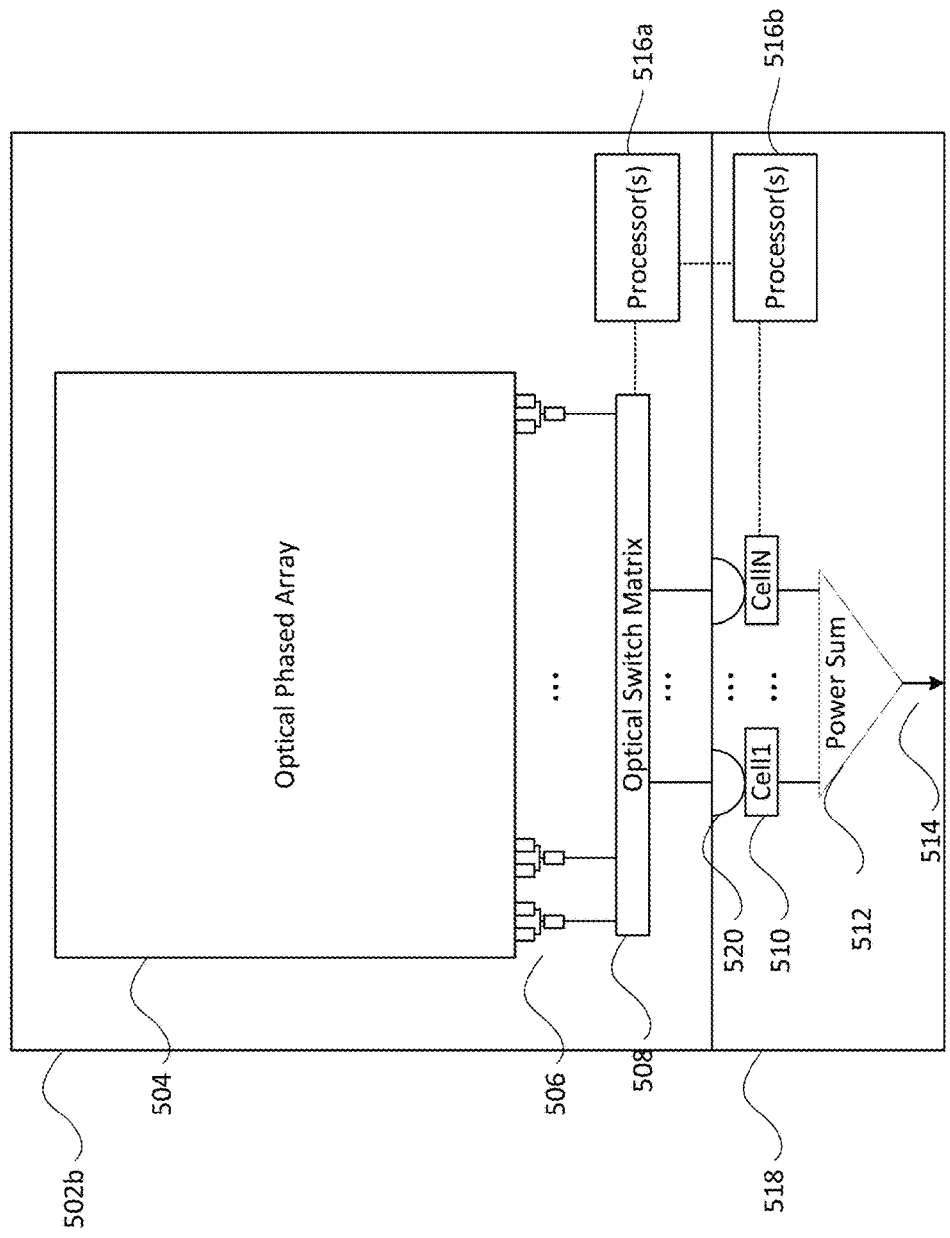

FIG. 5b illustrates an example of a PIC 502b of the optical power receiver 500b operatively coupled to a power conversion module 518. The PIC 502b of an optical terminal illustrated in FIG. 5b includes the receiver OPA 504, the waveguide configuration 506, and the optical switch matrix 508, and one or more processors 516a. The power conversion module 518 of an optical terminal illustrated in FIG. 5b includes an array of coupling lenses 520, the plurality of cells 510, the power summation electronics 512, the power output 514, and one or more processors 516b.

The one or more processors 516a may be configured the same or similarly to the one or more processors 104, the one or more processors 424, the one or more processors 444, and the one or more processors 516 discussed above. The one or more processors 516a may include an OPA controller configured to drive the plurality of phase shifters of the receiver OPA 504. The one or more processors 516a may include an optical switch controller configured to control the optical switch matrix 508. In this regard, the one or more processors 516a may be configured to receive a determined distribution of power across the plurality of cells 510. Additionally, the one or more processors 516a may be configured to send a control signal to the optical switch matrix 508, the control signal containing the determined distribution. The one or more processors 516b may be configured to determine a distribution of power across the plurality of cells 510. The distribution may be determined based on one or more electrical performance metrics (e.g., the one or more values discussed above) and/or a comparison thereof. One or more processors 516b may be further configured to send the determined distribution to one or more processors 516a.

Figure 5C:
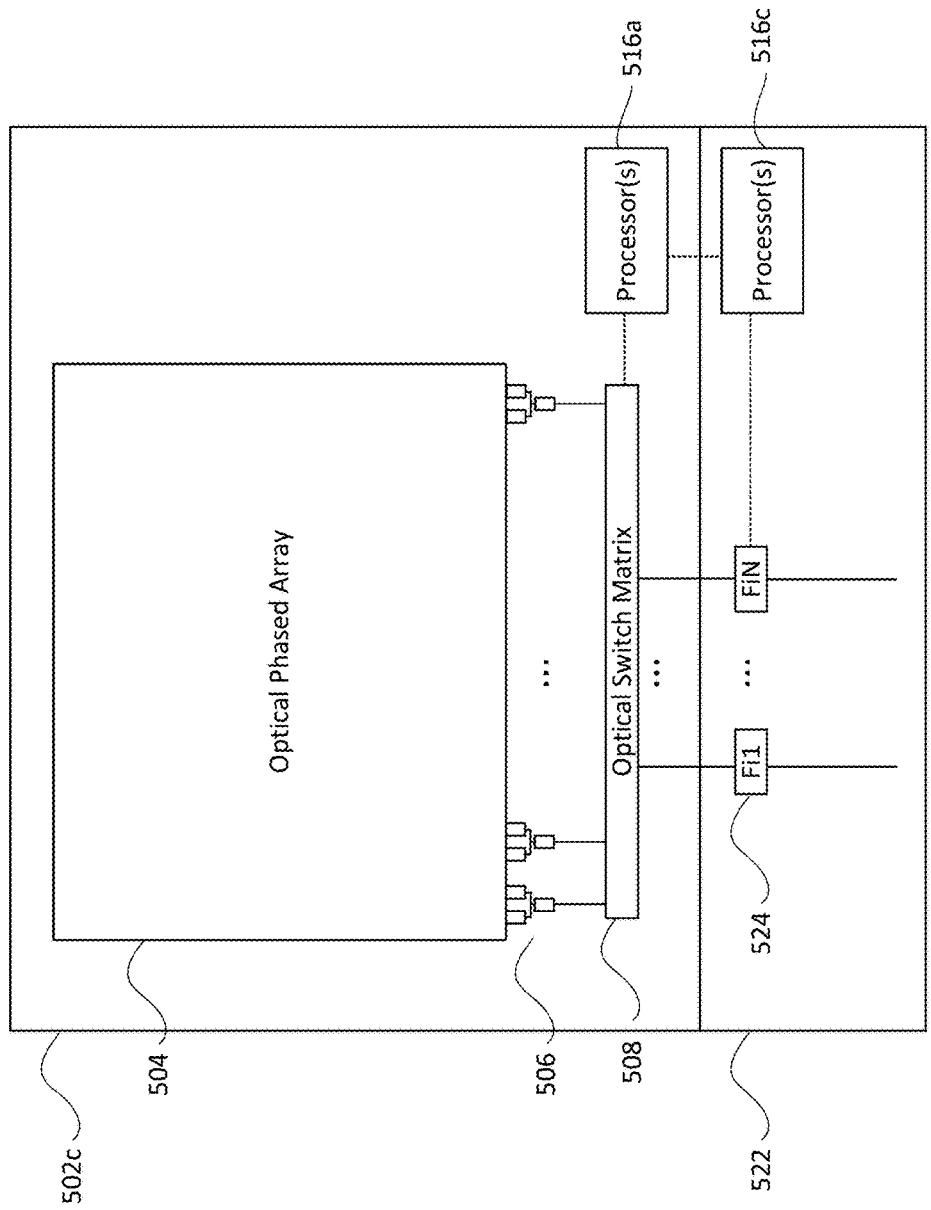

FIG. 5c illustrates an example of a PIC 502c of the optical power receiver 500c operatively coupled to a fiber coupling module 522. The PIC 502c of an optical terminal illustrated in FIG. 5c includes the receiver OPA 504, the waveguide configuration 506, and the optical switch matrix 508, and the one or more processors 516a. The fiber coupling module 522 of an optical terminal illustrated in FIG. 5c includes an optical fiber array 524 and one or more processors 516c.

The plurality of waveguide configurations 506 may be coupled to and configured to direct one or more received optical power beams to the optical switch matrix 508. The optical switch matrix 508 may include a plurality of switches configured to distribute power from the one or more optical power beams across a plurality of optical fibers (e.g., waveguides) of an optical fiber array 524. The switch matrix may consist of a cascaded 1×2 multi-mode interference (MMI) coupler array or a single 1×n MMI. The MMI may utilize thermal-optic, charge injection, electro-optic, phase change technologies or a combination thereof as the plurality of switches.

The one or more processors 516a may include an OPA controller configured to drive the plurality of phase shifters of the receiver OPA 504. In some instances, the one or more processors 516a may include an optical switch controller configured to control the optical switch matrix 508. In this regard, the one or more processors 516a may be configured to receive a determined distribution of power across the plurality of optical fiber of the optical fiber array 524. Additionally, the one or more processors 516a may be configured to send a control signal to the optical switch matrix 508, the control signal containing the determined distribution. The one or more processors 516c may be configured to determine a distribution of power across the plurality of optical fibers of the optical fiber array 524. The distribution may be determined based on one or more electrical performance metrics (e.g., the one or more values discussed above) and/or a comparison thereof. One or more processors 516c may be further configured to send the determined distribution to one or more processors 516a. The one or more processors 516c may be utilized to direct the one or more optical power beams into a specific fiber or provide a specific power distribution into the plurality of optical fibers of the optical fiber array 524. Such a specific distribution may be based on one or more received inputs. For example, it may be desirable to direct power to a specific location corresponding to one optical fiber of the plurality of optical fibers of the optical fiber array 524. As such, the one or more processors 516c may determine a distribution such that the optical power is directed via the one optical fiber of the plurality of optical fibers of the optical fiber array 524.

The fiber coupling module 522 of FIG. 5c includes an optical fiber array 524. The optical fiber array 524 may contain a plurality of optical fibers (e.g., waveguides). In this regard, the plurality of optical fibers of the optical fiber array 524 may be configured to direct power from the one or more optical power beams downstream to the external power conversion array or power module for later conversion to electrical energy. In some examples, the external power conversion array or power conversion module may contain components comparable to power conversion module 518.

Figure 5D:
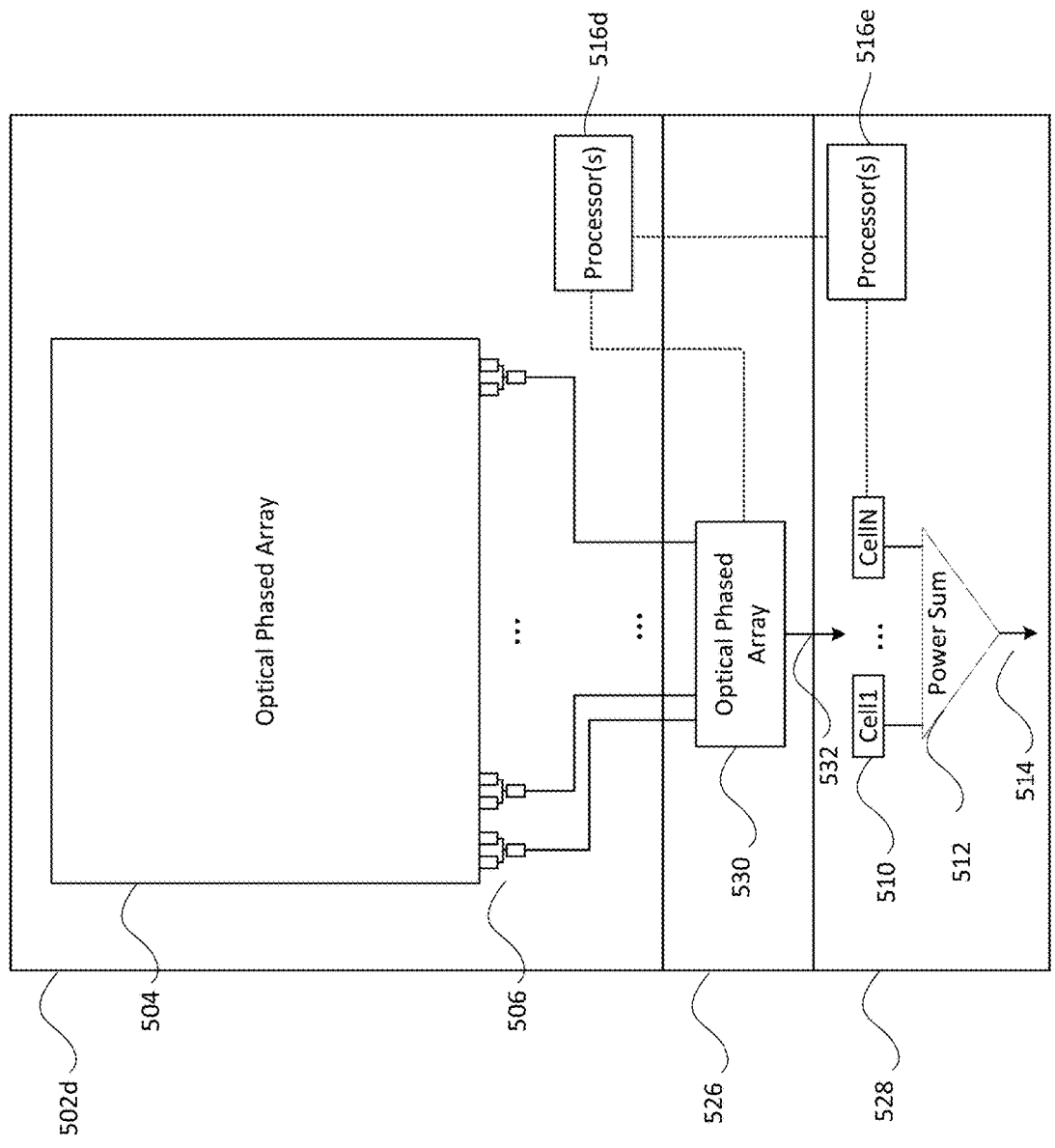

FIG. 5d illustrates an example of a PIC 502d of the optical power receiver 500d operatively coupled to an OPA module 526 and a coupling module 528. The PIC 502d of an optical terminal illustrated in FIG. 5d includes the receiver OPA 504, the waveguide configuration 506, and one or more processors 516d. The OPA module 526 of an optical terminal illustrated in FIG. 5d includes a target OPA 530. The coupling module 528 of an optical terminal illustrated in FIG. 5d includes the plurality of cells 510, the power summation electronics 512, the power output 514, and one or more processors 516c.

The plurality of waveguide configurations 506 may be coupled to and configured to direct one or more received optical power beams to a target OPA 530 on the OPA module 526. The target OPA 530 may also include components discussed above such as a micro-lens array, a plurality of emitters, and a plurality of phase shifters. In this regard the target OPA 530 may be configured the same or similarly as OPA architecture 114, the target OPA of the power conversion array 420, and the receiver OPA 504 as discussed above. The target OPA 530 may be configured to transmit one or more optical power beams 532 to the plurality of cells 510 the coupling module 528. In some instances, the target OPA 530 may be configured to transmit one or more control beams 532 to the plurality of cells 510 of the coupling module 528.

The plurality of cells 510 may be configured as discussed above and additionally be configured to convert power from the one or more optical power beams 532 to electrical power.

The one or more processors 516d may include an OPA controller configured to drive the plurality of phase shifters of the receiver OPA 504 and the plurality of phase shifters of the target OPA 530. In some instances, the OPA controller may be configured to receive parameters of the one or more optical power beams 532 and/or one or more control beams 532 corresponding to a received distribution of one or more optical power beams 532 and/or one or more control beams 532 across the plurality of cells 510. Additionally, the one or more processors 516d may be configured to send a control signal to the target OPA 530, the control signal containing the determined parameters corresponding to the distribution. The one or more processors 516e may be configured to determine the distribution of power across the plurality of cells 510 and/or parameters of the one or more optical power beams 532. The distribution may be determined based on one or more electrical performance metrics (e.g., the one or more values discussed above) and/or a comparison thereof.

One or more processors 516e may be further configured to send the determined distribution to one or more processors 516d.

Example Methods

When converting power from one or more optical power beams to electrical power, the first optical terminal may distribute power across the plurality of cells of the power conversion array. In some instances, the distribution of power may be controlled by the optical switch matrix. In this regard, a method of converting power received in one or more optical power beams to electrical power may include controlling an optical switch matrix.

Figure 6:
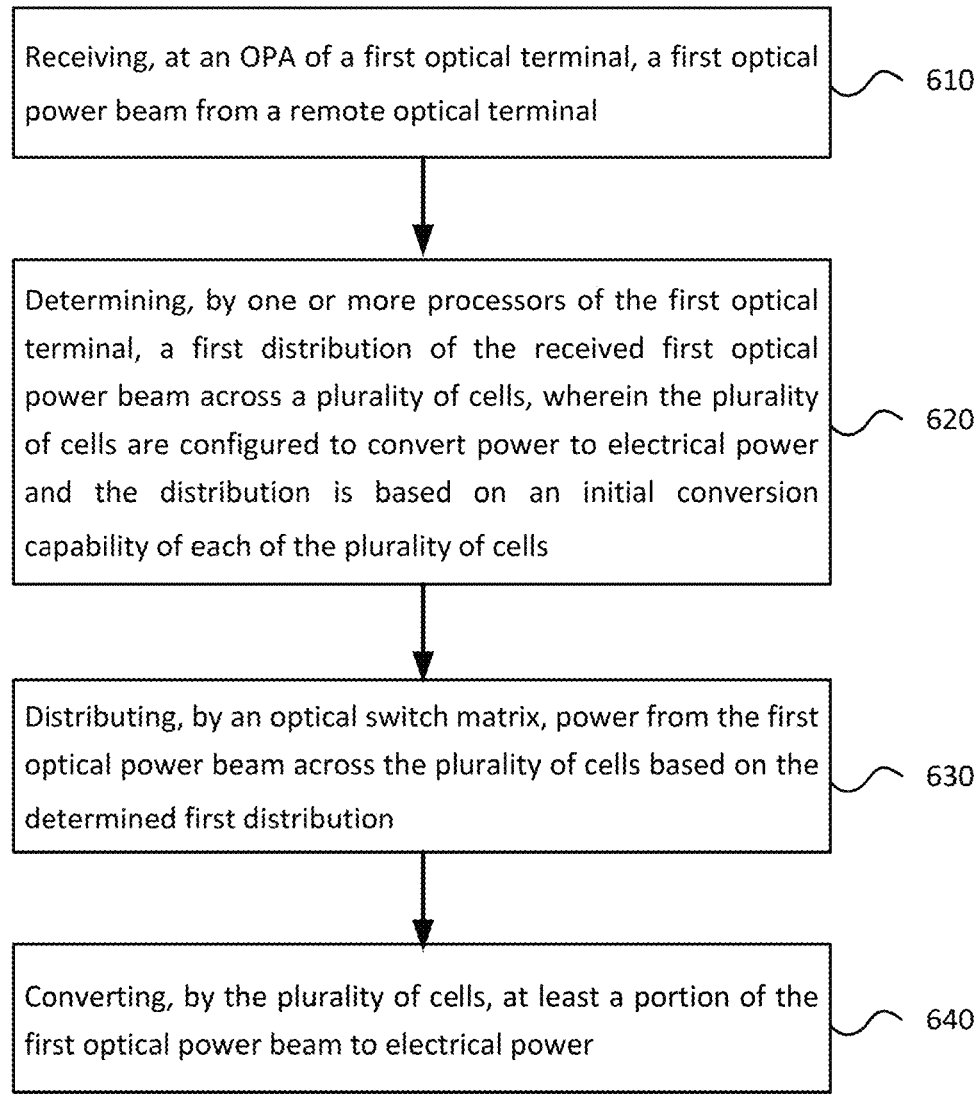
FIG. 6 is a flow diagram in accordance with aspects of the disclosure.

FIG. 6 illustrates an example method 600 of converting power received in one or more optical power beams to electrical power. As shown at block 610, the method includes receiving, at an OPA of a first optical terminal, a first optical power beam from a remote optical terminal. In this regard, the first optical power beam may be received by the OPA 114, 418, 504 of the first optical terminal 102, 402 from a remote optical terminal (e.g., a second optical terminal 122, 412 or another optical terminal).

At block 620, the method includes determining, by one or more processors of the first optical terminal, a first distribution of the received first optical power beam across a plurality of cells. The plurality of cells are configured to convert optical power to electrical power, and the first distribution is determined based on an initial conversion capability of each of the plurality of cells. For instance, the one or more processors 104, 424, 516, 516b, 516c, 516e of the first optical terminal 102, 402 may determine a first distribution of power or how the power of the first optical power beam is distributed across the plurality of cells 510. The first distribution may be such that the power may be distributed to allow each of the plurality of cells 510 to be situated to convert the maximum amount of power to electrical power. In this regard, the initial conversion capability of each of the plurality of cells 510 may be utilized to determine the first distribution across the plurality of cells. In some examples, the initial conversion capability may be determined at manufacture of the first optical terminal 102, 402. In this regard, the initial calibration may serve as a reference for operational parameters, conversion efficiency comparison for identification of damaged cells, or both.

At block 630, the method further includes distributing, by an optical switch matrix, power from the first optical power beam across the plurality of cells based on the determined first distribution. To distribute the power from the first optical power beam across the plurality of cells 510, one or more processors 104, 424, 516, 516a of the first optical terminal 102, 402 may send a control signal containing the first distribution to the optical switch matrix 508. The one or more processors of the first optical terminal 102, 402 may drive the optical switch matrix 508 based on the control signal containing the first distribution. To drive the optical switch matrix 508, the one or more processors of the first optical terminal may modify or shift one or more elements of the optical switch matrix. In this regard, the power of the first optical power beam may be distributed across the plurality of cells 510 in accordance with the determined first distribution.

For example, the plurality of cells 510 may be four photovoltaic cells each with an initial conversion capacity of 2 W of power to 1 W of electrical power per time step. Moreover, a received first optical power beam may contain 8 W of power. In such an example, 2 W of power from the optical beam may be distributed to each of the four photovoltaic cells. In another example, two of the four photovoltaic cells may have an initial conversion capacity of 2 W of power to 1 W of electrical power per time step while the other two of the four photovoltaic cells may have an initial conversion capacity of 1 W of power to 0.5 W of electrical power per time step. Moreover, a received first optical power beam may contain 8 W of power. In such an example, 3.2 W of power from the optical beam may be distributed to each of the two of the four photovoltaic cells with the initial conversion capacity of 2 W of power to 1 W and 1.6 W of power may be distributed to each of the two of the four photovoltaic cells with the initial conversion capacity of 1 W of power to 0.5 W.

In some examples, the first distribution may be such that one or more threshold limits (e.g., optical power density, illumination, operational temperature, etc.) of the plurality of cells 510 are not reached. For example, one of the one or more threshold limits of the plurality of cells 510 may be an optical power density of 20 W per cell. In such an example, the first distribution of optical power may be such that none of the plurality of cells reach an optical power density of 20 W per cell or higher. As such, the first distribution may be such that less than 20 W of power of the optical beam is distributed to each cell of the plurality of cells 510. In another example, one of the one or more threshold limits of the plurality of cells 510 may be a temperature limit of 38° C. In such an example, the first distribution of optical power may be such that none of the plurality of cells reach a temperature 38° C. or higher.

At block 640, the method further includes converting, by the plurality of cells, at least a portion of the first optical power beam to electrical power. In this regard, the plurality of cells 510 may convert power of the first optical power beam to electrical power. The plurality of cells 510 may be semiconductors (e.g., photovoltaics), thermal energy conversion cells, etc., or any combination thereof.

Additionally or alternatively, in some implementations, the power conversion may be conducted downstream from the first optical terminal 102, 402. In this regard, distributing, by an optical switch matrix, power from the first optical power beam across the plurality of cells based on the determined first distribution may include distributing, by the optical switch matrix, power from the first optical power beam across a plurality of fibers of an optical fiber array based on the first distribution. In this regard, optical power from the first optical power beam may be distributed across the plurality of optical fibers (e.g., waveguides) of the optical fiber array 524 according to the first distribution. The plurality of fibers may direct to direct power from the one or more optical power beams downstream to the external power conversion array. The external power array may include a plurality of cells such as cells 510 configured to convert the optical power to electrical power as discussed above.

In some instances, a first optical terminal may utilize a control loop when converting power from one or more optical power beams to electrical power. In this regard, the control loop may be utilized in determining distributions of received optical power beams across the plurality of cells 510. In some instances, the control loop may be a feedback control loop. In this regard, the feedback control loop may utilize measured values to update conversion parameters at each time step (e.g., 0.01 ms, 0.1 ms, 1 ms, or more or less).

Utilizing the control loop may include measuring one or more values. The one or more values may be measured by one or more sensors 426 of the first optical terminal 102, 402. For example, the measured one or more values may include an amount of power distributed to each of the plurality of cells 510, an amount of electrical power converted by each of the plurality of cells 510, a total amount of electrical power converted by the plurality of cells 510, or any combination.

In some instances, the measured one or more values may include the power received at each of the plurality of unit cells of the OPA 114, 418, 504, the power received at the each of plurality of super cells of the OPA 114, 418, 504, the total power received by the cells of the OPA 114, 418, 504, or any combination thereof. In some instances, the measured one or more values may be illumination distributed to each of the plurality of cells 510. In some instances, the measured one or more values may be temperature distributed to each of the plurality of cells.

Utilizing the control loop may further include receiving, at the OPA of the first optical terminal, a second optical power beam from the remote optical terminal. In this regard, the first optical power beam may be received by the OPA 114, 418, 504 of the first optical terminal 102, 402 from a remote optical terminal (e.g., the second optical terminal 122, 412). The second optical power beam may be received at a time step following the time step of the first optical power beam. In some examples, the timestep of the second optical power beam may directly follow the time step of the first optical power beam.

Utilizing the control loop may further include determining a second distribution of the received second optical power beam across the plurality of cells, wherein the second distribution is based on at least one of the measured one or more values. In this regard, the one or more values may be indicative of a second conversion capability of each cell of the plurality of cells 510. In some instances, the one or more values may be indicative of if one or more cells of the plurality of cells 510 are burnt out (e.g., function below a threshold value). In such an implementation, if the one or more values indicate one or more cells of the plurality of cells 510 are functioning below a threshold value, the one or more cells 510 may be bypassed. In this regard, the second distribution may include not distributing power to the one or more cells 510 functioning below a threshold value. For example, the threshold value of the plurality of cells 510 may be a conversion efficiency of 10%. In such an example, if the one or more of the plurality of cells 510 are functioning with a conversion efficiency of 10% or lower, the second distribution may include not distribution optical power to the one or more of the plurality of cells 510.

Additionally, as discussed above, in some examples, the second distribution may be such that one or more threshold limits (e.g., optical power density, illumination, operational temperature, etc.) of the plurality of cells 510 are not reached.

In some instances, the above discussed control loop may be used in a calibration stage. In this regard, an OPA 114, 418, 504 of the first optical terminal 102, 402 may transmit a control beam. The control beam may be a low power beam (e.g., a beam lower in power than an optical power beam for transferring power). The control beam may be reflected back to the OPA 114, 418, 504 of the first optical terminal 102, 402. The control beam may be received in addition to one or more optical power beams or as an alternative. In this regard, the reflected control beam may be used in the above discussed control loop. The control beam may be reflected back using a reference surface (not shown) that simulates optical properties of the beam target (e.g., and OPA).

In some instances, the distribution of power may be controlled by the target OPA. In this regard, a method of converting power received in one or more optical power beams to electrical power may include driving a target OPA.

Figure 7:
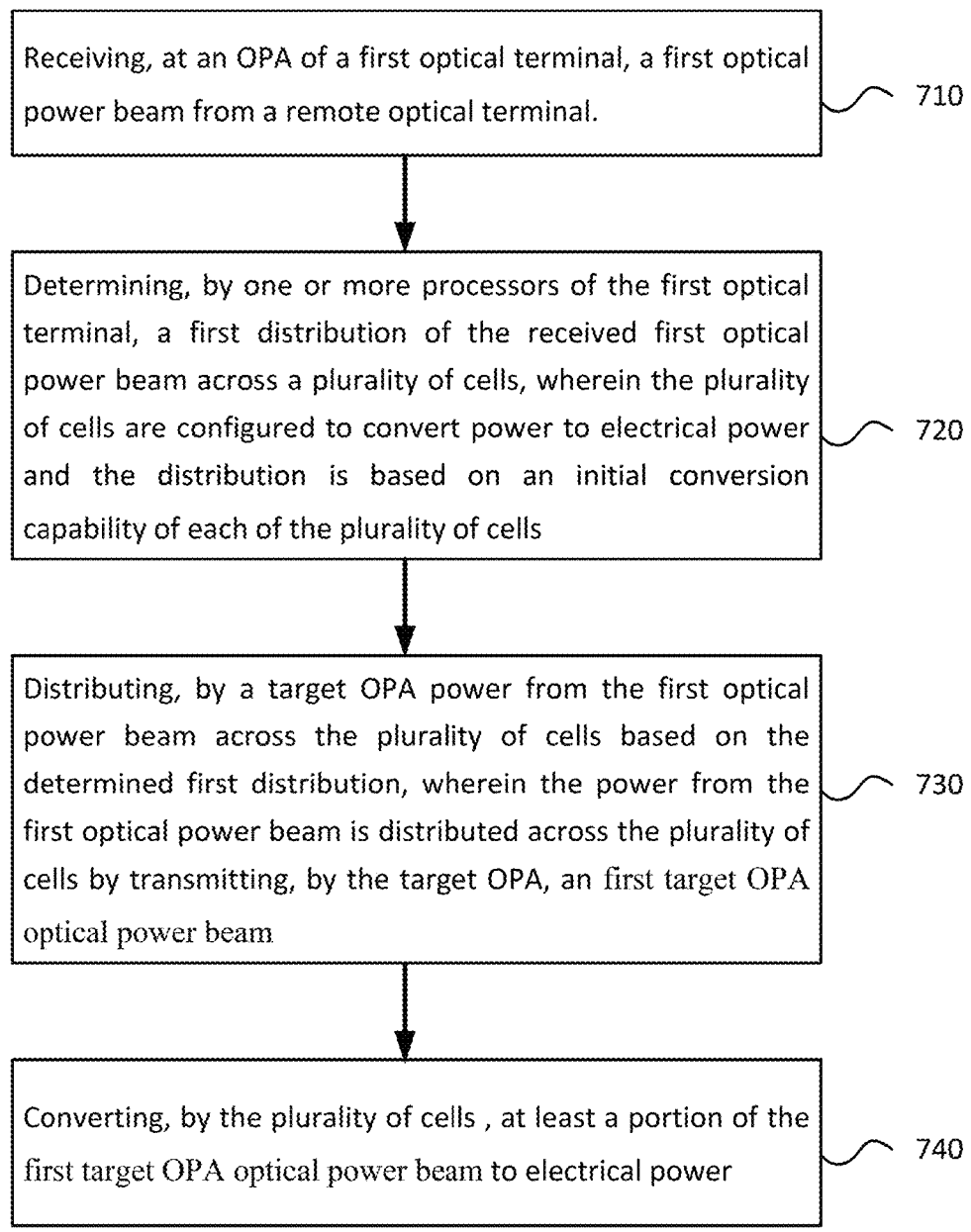
FIG. 7 is another flow diagram in accordance with aspects of the disclosure.

FIG. 7 illustrates an example method 700 of converting power received in one or more optical power beams to electrical power. As shown at block 710, the method includes receiving, at an OPA of a first optical terminal, a first optical power beam from a remote optical terminal. In this regard, the first optical power beam may be received by the OPA 114, 418, 504 of the first optical terminal 102, 402 from a remote optical terminal (e.g., a second optical terminal 122, 412).

At block 720, the method includes determining, by one or more processors of the first optical terminal, a first distribution of the received first optical power beam across a plurality of cells. The plurality of cells are configured to convert optical power to electrical power, and the first distribution is determined based on an initial conversion capability of each of the plurality of cells. For instance, the one or more processors 104, 424, 516e of the first optical terminal 102, 402 may determine a first distribution of power or how the power of the first optical power beam is distributed across the plurality of cells 510. The first distribution may be such that the power may be distributed to allow each of the plurality of cells 510 to be situated to convert the maximum amount of power to electrical power. In this regard, the initial conversion capability of each of the plurality of cells 510 may be utilized to determine the first distribution across the plurality of cells. In some examples, the initial conversion capability may be determined at manufacture of the first optical terminal 102, 402. In this regard, the initial calibration may serve as a reference for operational parameters, conversion efficiency comparison for identification of damaged cells, or both.

At block 730, the method further includes distributing, by a target OPA power from the first optical power beam across the plurality of cells based on the determined first distribution, wherein the power from the first optical power beam is distributed across the plurality of cells by transmitting, by the target OPA, a first target OPA optical power beam. To distribute the power from the first optical power beam across the plurality of cells 510, one or more processors 104, 424, 516d of the first optical terminal 102, 402 may send a control signal containing parameters corresponding to the first distribution to the target OPA 530. The one or more processors of the first optical terminal 102, 402 may drive the target OPA 530 based on the control signal containing parameters corresponding to the first distribution. To drive the target OPA 530, the one or more processors 104, 424, 516d, of the first optical terminal 102, 402 may modify or shift one or more phase shifters of the target OPA 530. In this regard, the power of the first optical power beam may be distributed across the plurality of cells 510 in accordance with the determined first distribution.

For example, the plurality of cells 510 may be four photovoltaic cells each with an initial conversion capacity of 2 W of power to 1 W of electrical power per time step. Moreover, a received first optical power beam may contain 8 W of power. In such an example, 2 W of power from the optical beam may be distributed to each of the four photovoltaic cells. In another example, two of the four photovoltaic cells may have an initial conversion capacity of 2 W of power to 1 W of electrical power per time step while the other two of the four photovoltaic cells may have an initial conversion capacity of 1 W of power to 0.5 W of electrical power per time step. Moreover, a received first optical power beam may contain 8 W of power. In such an example, 3.2 W of power from the optical beam may be distributed to each of the two of the four photovoltaic cells with the initial conversion capacity of 2 W of power to 1 W and 1.6 W of power may be distributed to each of the two of the four photovoltaic cells with the initial conversion capacity of 1 W of power to 0.5 W.

In some examples, the first distribution may be such that one or more threshold limits (e.g., optical power density, illumination, operational temperature, etc.) of the plurality of cells 510 are not reached. For example, one of the one or more threshold limits of the plurality of cells 510 may be an optical power density of 20 W per cell. In such an example, the first distribution of optical power may be such that none of the plurality of cells reach an optical power density of 20 W per cell or higher. As such, the first distribution may be such that less than 20 W of power of the optical beam is distributed to each cell of the plurality of cells 510. In another example, one of the one or more threshold limits of the plurality of cells 510 may be a temperature limit of 38° C. In such an example, the first distribution of optical power may be such that none of the plurality of cells reach a temperature 38° C. or higher.

At block 740, the method further includes converting, by the plurality of cells, at least a portion of the first target OPA optical power beam to electrical power. In this regard, the plurality of cells 510 may convert power of the first optical power beam to electrical power. The plurality of cells 510 may be semiconductors (e.g., photovoltaics), thermal energy conversion cells, etc., or any combination thereof.

In some instances, a first optical terminal may utilize a control loop when converting power from one or more optical power beams to electrical power. In this regard, the control loop may be utilized in determining distributions of received optical power beams across the plurality of cells 510. In some instances, the control loop may be a feedback control loop. In this regard, the feedback control loop may utilize measured values to update conversion parameters at each time step (e.g., 0.01 ms, 0.1 ms, 1 ms, or more or less).

Utilizing the control loop may include measuring one or more values. The one or more values may be measured by one or more sensors 426 of the first optical terminal 102, 402. For example, the measured one or more values may include an amount of power distributed to each of the plurality of cells 510, an amount of electrical power converted by each of the plurality of cells 510, a total amount of electrical power converted by the plurality of cells 510, or any combination.

In some instances, the measured one or more values may include the power received at each of the plurality of unit cells of the OPA 114, 418, 504 and/or the target OPA 530, the power received at the each of plurality of super cells of the OPA 114, 418, 504 and/or the target OPA 530, the total power received by the cells of the OPA 114, 418, 504 and/or the target OPA 530, or any combination thereof. In some instances, the measured one or more values may be illumination distributed to each of the plurality of cells 510. In some instances, the measured one or more values may be temperature distributed to each of the plurality of cells 510.

Utilizing the control loop may further include receiving, at the OPA of the first optical terminal, a second optical power beam from the remote optical terminal. In this regard, the first optical power beam may be received by the OPA 114, 418, 504 of the first optical terminal 102, 402 from a remote optical terminal (e.g., the second optical terminal 122, 412). The second optical power beam may be received at a time step following the time step of the first optical power beam. In some examples, the timestep of the second optical power beam may directly follow the time step of the first optical power beam.

Utilizing the control loop may further include determining a second distribution of the received second optical power beam across the plurality of cells, wherein the second distribution is based on at least one of the measured one or more values. In this regard, the one or more values may be indicative of a second conversion capability of each cell of the plurality of cells 510. In some instances, in some implementations, the one or more values may be indicative of if one or more cells of the plurality of cells 510 are burnt out (e.g., function below a threshold value). In such an implementation, if the one or more values indicate one or more cells of the plurality of cells 510 are functioning below a threshold value, the one or more cells 510 may be bypassed. In this regard, the second distribution may include not distributing power to the one or more cells 510 functioning below a threshold value. For example, the threshold value of the plurality of cells 510 may be a conversion efficiency of 10%. In such an example, if the one or more of the plurality of cells 510 are functioning with a conversion efficiency of 10% or lower, the second distribution may include not distribution optical power to the one or more of the plurality of cells 510.

Additionally, as discussed above, in some examples, the second distribution may be such that one or more threshold limits (e.g., optical power density, illumination, operational temperature, etc.) of the plurality of cells 510 are not reached.

In some instances, in some implementations, the above discussed control loop may be used in a calibration stage. In this regard, the target OPA 530 of the first optical terminal 102, 402 may transmit a control beam. The control beam may be a low power beam (e.g., a beam lower in power than an optical power beam for transferring power). The control beam may be reflected back to the target OPA 530 of the first optical terminal 102, 402. In this regard, the reflected control beam may be used in the above discussed control loop. The control beam may be reflected back using a reference surface (not shown) that simulates optical properties of the beam target (e.g., and OPA).

In some instances, the first optical terminal may be configured to correct for phase errors of optical power beams and/or control beams transmitted from the target OPA. In this regard, the correcting may include transmitting, determining a phase error associated with the optical power beam transmitted by the target OPA. In this regard, the phase error may be determined through a number of mechanisms including a wavefront sensor of the one or more sensors 426, through utilization of an orthonormal set of functions (such as Walsh functions), or both.

In one example, the wavefront sensor may detect aberrations in a wavefront of the transmitted optical power beam. In this regard, an error associated with the optical power beam may be determined based on the detected aberrations.

In another example, each received optical power beam may be dithered according to an orthonormal set of functions. The dithering may be time-division dithering, frequency division dithering, or some combination thereof. Dithers may be applied to differing subsets of phase shifters of the plurality of phase shifters. Each subset of phase shifters may correspond to a function of the orthonormal set of functions. A phase error associated with each dither may be determined by measuring the received power resulting from each dither. A correction (e.g., compensation for phase error) may be determined for each dither based on the determined phase error.

For time-division dithering, each received optical power beam may be received sequentially. In this regard, a dither may be applied to a different subset of phase shifters for each sequential received beam. The dither frequency for each beam may be selected from a predetermined set of frequencies. The frequency of each dither may or may not be the same.

For frequency-division dithering, each received optical power beam may be received simultaneously. In this regard, a dither may be applied to a different subset of phase shifters for each received beam. The dither frequency for each beam may be selected from a predetermined set of frequencies. In some instances, each of the frequencies of the predetermined set of frequencies may be unique. In such instances, the frequencies of the predetermined set of frequencies may be selected such that they do not interfere with one another. In some instances, each of the plurality of predetermined frequencies may not be unique. In such instances, the perturbation of the plurality of perturbations utilizing the same frequencies, or frequencies that may interfere, may be selected such that they will not interfere. For example, if two perturbations utilize the same frequency, one perturbation may be utilized via a sine function and the other may be utilized a cosine function where one of the functions may be shifted by $\pi/2$ such that the perturbations are orthogonal and/or out of phase.

The correcting may further include, driving, by the one or more processors of the first optical terminal, the target OPA based on the determined phase error. In this regard, the first optical terminal 102, 402 may drive the target OPA 530 to adjust the optical power beam to correct for the determined phase error.

When transmitting and receiving optical power beams, a first optical terminal may be coupled with one or more remote optical terminals. In some instances, coupling with one or more remote optical terminals may include instructing one or more remote optical terminals to drive an OPA thereof to correct for phase error. In one example, the phase error may be due to atmospheric conditions. The atmospheric conditions may include, for example, mount vibration (e.g., jitter), wind, fog, etc.

As such, transmitting and receiving optical power beams may include instructing one or more remote optical terminals to drive an OPA thereof to correct for phase error. The instructing may include receiving, at an OPA of a first optical terminal, an optical power beam from a remote optical terminal. In this regard, the optical power beam may be received by the OPA 114, 418, 504 of the first optical terminal 102, 402 from a remote optical terminal e.g., second optical terminal 122, 412).

The instructing may further include determining the phase error associated with the optical power beam. The phase error may be determined through a number of mechanisms including a wavefront sensor of the one or more sensors 426, through utilization of an orthonormal set of functions (such as Walsh functions), or both.

In one example, the wavefront sensor may detect aberrations in a wavefront of the received optical power beam. In this regard, an error associated with the optical power beam may be determined based on the detected aberrations.

In another example, each received optical power beam may be dithered according to an orthonormal set of functions. The dithering may be time-division dithering, frequency division dithering, or some combination thereof as discussed above.

The instructing may further include, transmitting, a communication to a remote optical terminal, the communication instructing the remote optical terminal to drive an OPA of the remote optical terminal based on the determined phase error. In this regard, the communication may instruct the remote optical terminal (e.g., the second optical terminal 122, 412) to adjust the optical power beam to correct for the determined phase error. In some examples, the communication may include a correction determined based on the measured phase error. In some examples, the communication may be an RF communication. In such an example the RF communication may be transmitted via an RF communications system 428 of the first optical terminal 102, 402. In another example, the communication may be an optical communication beam transmitted using the OPA 114, 418, 504, of the first optical terminal 102, 402. In some instances, the optical communication beam may be dithered as discussed above.

The features and methodology described herein may provide a PTOL system containing optical terminals with increased coupling and power conversion capabilities. In this regard, such a PTOL system allows for a lower cost, less complex, and scalable system and methodology for conversion of power from one or more optical beams to electrical power. The PTOL system described provides a much broader utilization range over variable real-world operating conditions. Changes in the distance and pose angle between the transmitter and receiver, as well as the large variation in the on receiver optical power levels for example resulting from environmental factors such as fog, haze, rain, snow can be accommodated by its dynamic feedback control.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of converting power received in one or more optical power beams to electrical power, the method comprising:
   receiving, at an OPA of a first optical terminal, a first optical power beam from a remote optical terminal;
   determining, by one or more processors of the first optical terminal, a first distribution of the received first optical power beam across a plurality of cells, wherein the plurality of cells are configured to convert power from the from optical power beams to electrical power and, the first distribution is determined based on an initial conversion capability of each of the plurality of cells;
   distributing, by an optical switch matrix, power from the first optical power beam across the plurality of cells based on the determined first distribution; and converting, by the plurality, at least a portion of the first optical power beam to electrical power.

2. The method of claim 1, further comprising:
measuring one or more values associated with the first optical power beam;
receiving, at the OPA of the first optical terminal, a second optical power beam from the remote optical terminal; and
determining a second distribution of the received second optical power beam across the plurality of cells, wherein the second distribution is based on at least one of the measured one or more values.

3. The method of claim 2, wherein the first optical power beam is received at the OPA of the first optical terminal at a first time step and the second optical power beam is received at the OPA of the first optical terminal at a second time step.

4. The method of claim 2, wherein the second distribution is further based on a threshold value of the plurality of cells.

5. The method of claim 4, wherein the threshold value of the plurality of cells is a conversion efficiency.

6. The method of claim 1, wherein the first distribution is further based on one or more threshold limits of the plurality of cells.

7. The method of claim 6, wherein the one or more threshold limits of the plurality of cells include at least one of i) optical power density, ii) illumination, and iii) operational temperature.

8. The method of claim 1, wherein distributing, by the optical switch matrix, the power from the first optical power beam across the plurality of cells based on the determined first distribution includes:
distributing, by the optical switch matrix, the power from the first optical power beam across a plurality of fibers of an optical fiber array based on the first distribution.

9. A method of converting power received in one or more optical power beams to electrical power, the method comprising:
receiving, at an OPA of a first optical terminal, a first optical power beam from a remote optical terminal;
determining, by one or more processors of the first optical terminal, a first distribution of the received first optical power beam across a plurality of cells, wherein the plurality of cells are configured to convert optical power to electrical power, and the first distribution is determined based on an initial conversion capability of each of the plurality of cells;
distributing, by a target OPA power from the first optical power beam across the plurality of cells based on the determined first distribution, wherein power from the first optical power beam is distributed across the plurality of cells by transmitting, by the target OPA, a first target OPA optical power beam; and
converting, by the plurality of cells, at least a portion of the first target OPA optical power beam to electrical power.

10. The method of claim 9, further comprising:
measuring one or more values associated with the first optical power beam and the first target OPA optical power beam;
receiving, at the OPA of the first optical terminal, a second optical power beam from the remote optical terminal; and
determining a second distribution of the received second optical power beam across the plurality of cells, wherein the second distribution is based on at least one of the measured one or more values.

11. The method of claim 10, wherein the first optical power beam is received at the OPA of the first optical terminal at a first time step and the second optical power beam is received at the OPA of the first optical terminal at a second time step.

12. The method of claim 10, wherein the second distribution is further based on a threshold value of the plurality of cells.

13. The method of claim 12, wherein the threshold value of the plurality of cells is a conversion efficiency.

14. The method of claim 9, wherein the first distribution is further based on one or more threshold limits of the plurality of cells.

15. The method of claim 14, wherein the one or more threshold limits of the plurality of cells include at least one of i) optical power density, ii) illumination, and iii) operational temperature.

16. An optical terminal of a PTOL system, the optical terminal comprising:
an optical phased array (OPA) configured to receive one or more optical power beams from one or more remote optical terminals;
a plurality of cells, the plurality of cells configured to convert power from the one or more optical power beams to electrical power;
an optical switch matrix configured to distribute power of from optical power beams across the plurality of cells; and
one or more processors, configured to determine one or more distributions of optical power across the plurality of cells, wherein the one or more distributions are based on an initial conversion capability of each of the plurality of cells.

17. The optical terminal of claim 16, further comprising one or more sensors configured to measure one or more values relating to the received one or more optical power beams.

18. The optical terminal of claim 16, further comprising, a plurality of fibers of an optical fiber array configured to direct power from the optical switch matrix to the plurality of cells.

19. The optical terminal of claim 16, wherein the plurality of cells are one of i) semiconductors or ii) thermal energy conversion cells.

20. An optical terminal of a PTOL system, the optical terminal comprising:
an optical phased array (OPA) configured to receive one or more optical power beams from one or more remote optical terminals;
a plurality of cells, the plurality of cells configured to convert power from the one or more optical power beams to electrical power;
a target OPA configured to transmit one or more optical power beams to the plurality of cells such that optical power from the received one or more optical power beams is distributed across the plurality of cells; and
one or more processors, configured to determine one or more distributions of optical power across the plurality of cells, wherein the one or more distributions are based on an initial conversion capability of each of the plurality of cells.

* * * * *